(12) United States Patent
Talebi et al.

(10) Patent No.: US 12,737,845 B2
(45) Date of Patent: Sep. 15, 2026

(54) MULTILAYER LAPLACIAN RESIZER FOR COMPUTER VISION SYSTEMS

(71) Applicant: Google LLC, Mountain View, CA (US)

(72) Inventors: Hossein Talebi, San Jose, CA (US); Zhengzhong Tu, Los Altos, CA (US); Peyman Milanfar, Menlo Park, CA (US)

(73) Assignee: GOOGLE LLC, Mountain View, CA (US)

( * ) Notice: Subject to any disclaimer, the term of this patent is extended or adjusted under 35 U.S.C. 154(b) by 223 days.

(21) Appl. No.: 18/621,434

(22) Filed: Mar. 29, 2024

(65) Prior Publication Data

US 2024/0331091 A1 Oct. 3, 2024

Related U.S. Application Data

(60) Provisional application No. 63/493,781, filed on Apr. 3, 2023.

(51) Int. Cl.
*G06T 5/20* (2006.01)
*G06T 5/50* (2006.01)

(52) U.S. Cl.
CPC .................. *G06T 5/20* (2013.01); *G06T 5/50* (2013.01); *G06T 2207/20024* (2013.01); *G06T 2207/20212* (2013.01)

(58) Field of Classification Search
None
See application file for complete search history.

(56) References Cited

U.S. PATENT DOCUMENTS 7,865,040 B1 * 1/2011 Georgiev .................. G06T 3/40 382/298
2008/0107352 A1 * 5/2008 Chang ....................... G06T 5/94 382/263

(Continued)

OTHER PUBLICATIONS

C. Hentschel and S. Schiemenz, "Spatial Up-scaler with Nonlinear Edge Enhancement for Rational Factors," 2007 Digest of Technical Papers International Conference on Consumer Electronics, Las Vegas, NV, USA, 2007, pp. 1-2. (Year: 2007).*

(Continued)

*Primary Examiner* — David Ometz
(74) *Attorney, Agent, or Firm* — Botos Churchill IP Law LLP

(57) ABSTRACT

The technology provides an image resizer that is jointly trainable with neural network classification (recognition) models, and is designed to improve classification performance. Systems and method include applying an input image to a baseline resizer to obtain a default resized image, and applying the input image to a plurality of filters. Each respective filter in the plurality is configured to perform sub-band filtering on the input image to obtain a sub-band filtered result. This includes applying the sub-band filtered result to the baseline resizer to obtain a respective resized result, and also includes applying to the respective resized result a scaling parameter, a bias parameter, and a nonlinear function to obtain a respective filtered image. The process then combines the default resized image and the respective filtered images to generate a combined resized image.

21 Claims, 29 Drawing Sheets
(19 of 29 Drawing Sheet(s) Filed in Color)

(56) References Cited

U.S. PATENT DOCUMENTS

2019/0130217 A1* 5/2019 Wu .......................... G06T 5/20
2020/0051209 A1* 2/2020 Smirnov .................. G06T 5/20

OTHER PUBLICATIONS

Tu, Zhengzhong , et al., Maxim:Multi-axis mlp for image processing. arXiv preprint arXiv:2201.02973, 2022.
Tu, Zhengzhong , et al., Maxvit:Multi-axis vision transformer. In Computer Vision-ECCV 2022: 17th European Conference, Tel Aviv, Israel, Oct. 23-27, 2022, Proceedings, Part XXIV, 20 pgs. Springer, 2022.
Vasconcelos, Cristina , et al., Impact of aliasing on generalization in deep convolutional networks. In Proceedings of the IEEE/CVF International Conference on Computer Vision, pp. 10529-10538, 2021.
Vaswani, Ashish , et al., Attention is all you need. Advances in neural information processing systems, 30, 2017.
Vaswani, Ashish , et al., Scaling local self-attention for parameter efficient visual backbones. In Proceedings of the IEEE/CVF Conference on Computer Vision and Pattern Recognition, pp. 12894-12904, 2021.
Wang, Zhou , Image quality assessment: from error visibility to structural similarity. IEEE transactions on image processing, 13(4):15 pgs., 2004.
Wu, Haiping , et al., Cvt: Introducing convolutions to vision transformers. In Proceedings of the IEEE/CVF International Conference on Computer Vision, pp. 22-31, 2021.
Xie, Saining , et al., Aggregated residual transformations for deep neural networks. In Proceedings of the IEEE conference on computer vision and pattern recognition, pp. 1492-1500, 2017.
Xu, Runsheng , et al., Bridging the domain gap for multi-agent perception. arXiv preprint arXiv:2210.08451, 2022.
Xu, Runsheng , et al., V2x-vit: Vehicle-to-everything cooperative perception with vision transformer. In Computer Vision-ECCV2022: 17th European Conference, Te/Aviv, Israel, Oct. 23-27, 2022, Proceedings, Part XXXIX, 28 pgs. Springer, 2022.
Zhang, Kai , et al., Beyond a gaussian denoiser: Residual learning of deep cnn for image denoising. IEEE transactions on image processing, 26(7):14 pgs., 2017.
Zhang, Richard , et al., Colorful image colorization. In Computer Vision-ECCV 2016: 14th European Conference, Amsterdam, The Netherlands, Oct. 11-14, 2016, Proceedings, Part III 14, pp. 649-666. Springer, 2016.
Zhao, Chen , et al., Thumbnet: One thumbnail image contains all you need for recognition. In Proceedings of the 28th ACM International Conference on Multimedia, pp. 1506-1514, 2020.
Abadi, Martin , et al., "Tensorflow: Large-scale machine learning on heterogeneous distributed systems", arXiv preprint arXiv:1603.04467, 2016, 19 Pages.
Brock, Andy , et al., "High-performance large-scale image recognition without normalization.", In International Conference on Machine Learning, pp. 1059-1071. PMLR, 2021.
Chen, Li-Heng , A progressive architecture for learned fractional downsampling. In 2021 Picture Coding Symposium (PCS), pp. 1-5. IEEE, 2021.
Chen, Wuyang , et al., A simple singlescale vision transformer for object localization and instance segmentation. CoRR, abs/2112.09747, 2021.
Chen, Li-Heng , et al., Estimating the resize parameter in end-to-end learned image compression. arXiv preprint arXiv:2204.12022, 2022.
Chen, Qiuyu , et al., "Adaptive fractional dilated convolution network for image aesthetics assessment", In Proceedings of the IEEE/CVF Conference on Computer Vision and Pattern Recognition, pp. 14114-14123, 2020.
Dai, Zihang , et al., Coatnet: Marrying convolution and attention for all data sizes. Advances in Neural Information Processing Systems, 34, 2021.
Dong, Xiaoyi , et al., Cswin transformer: A general vision transformer backbone with cross-shaped windows. arXiv preprint arXiv:2107.00652, 2021.
Dosovitskiy, Alexey , An image is worth 16×16 words: Transformers for image recognition at scale. arXiv preprint arXiv:2010.11929, 2020.
Haris, Muhammad , et al., Task-driven super resolution: Object detection in low-resolution images. In Neural Information Processing: 28th International Conference, ICONIP 2021, Sanur, Bali, Indonesia, Dec. 8-12, 2021, Proceedings, Part V 28, pp. 387-395. Springer, 2021.
He, Kaiming , et al., Deep residual learning for image recognition. In Proceedings of the IEEE conference on computer vision and pattern recognition, pp. 770-778, 2016.
Huang, Gao , et al., Densely connected convolutional networks. In Proceedings of the IEEE conference on computer vision and pattern recognition, pp. 4700-4708, 2017.
Ke, Junjie , et al., Musiq: Multi-scale image quality transformer. In Proceedings of the IEEE/CVF International Conference on Computer Vision, pp. 5148-5157, 2021.
Kolesnikov, Alexander , et al., Big transfer (bit): General visual representation learning. In European conference on computer vision, 17 pgs., Springer, 2020.
Krizhevsky, Alex , et al., Imagenet classification with deep convolutional neural networks. Advances in neural information processing systems, 25, 2012.
Li, Boyi , et al., Benchmarking single image dehazing and beyond. IEEE Transactions on Image Processing, 28(1):492-505, 2018.
Li, Yinxiao , et al., Comisr: Compression informed video super-resolution. In Proceedings of the IEEE/CVF International Conference on Computer Vision, pp. 2543-2552, 2021.
Li, Boyi , et al., End-to-end united video dehazing and detection. In Proceedings of the AAA/ Conference on Artificial Intelligence, vol. 32, 2018.
Li, Yue , et al., Learning a convolutional neural network for image compact-resolution. IEEE Transactions on Image Processing, 28(3): 17 pgs., 2018.
Li, Siyuan , et al., Single image deraining: A comprehensive benchmark analysis. In Proceedings of the IEEE/CVF Conference on Computer Vision and Pattern Recognition, 10 pgs., 2019.
Lin, Tsung-Yi , et al., Microsoft coco: Common objects in context. In European conference on computer vision, pp. 740-755. Springer, 2014.
Liu, Zhuang , et al., A convnet for the 2020s. arXiv preprint arXiv:2201 .03545, 2022.
Liu, Feng , et al., Disentangling features in 3d face shapes for joint face reconstruction and recognition. In Proceedings of the IEEE conference on computer vision and pattern recognition, pp. 5216-5225, 2018.
Liu, Ze , et al., Swin transformer: Hierarchical vision transformer using shifted windows. In Proceedings of the IEEE/CVF International Conference on Computer Vision, pp. 10012-10022, 2021.
Liu, Zhuang , et al., Transferable recognition-aware image processing. arXiv preprint arXiv:1910.09185, 2019.
Liu, Ding , et al., When image denoising meets high-level vision tasks: A deep learning approach. arXiv preprint arXiv:1706.04284, 2017.
Loshchillov, Ilya , et al., Decoupled Weight Decay Regularization, arXiv:1711.05101v3 [cs.LG] Jan. 4, 2019.
Loshchilov, Ilya , et al., Fixing Weight Decay Regularization in Adam, arXiv preprint aarXiv:1711.05101v2 [cs.LG] Feb. 14, 2018.
Loshcillov, Ilya , et al., Fixing Weight Decay Regularization in Adam, arXiv:1711.05101v1 [cs.LG] Nov. 14, 2017.
Mehdi, SM Sajjadi , et al., Enhancenet: Single image super-resolution through automated texture synthesis. arXiv preprint arXiv:1612.07919, 2016.
Milanfar, Peyman , A tour of modern image filtering: New insights and methods, both practical and theoretical. IEEE signal processing magazine, 30(1): 106-128, 2012.
Murray, Naila , et al., A large-scale database for aesthetic visual analysis. In 2012 IEEE conference on computer vision and pattern recognition, 8 pgs.. IEEE, 2012.

(56) References Cited

OTHER PUBLICATIONS

Parmar, Gaurav , et al., On buggy resizing libraries and surprising subtleties in fid calculation. arXiv preprint arXiv:2104.11222, 2021.
Paszke, Adam , et al., Pytorch: An imperative style, high-performance deep learning library. Advances in neural information processing systems, 32, 2019.
Ren, Shaoqing , et al., Faster r-cnn: Towards real-time object detection with region proposal networks. In C. Cortes, N. Lawrence, D. Lee, M. Sugiyama, and R. Garnett, editors, Advances in Neural Information Processing Systems, vol. 28. Curran Associates, Inc., 2015.
Riad, Rachid , et al., Learning strides in convolutional neural networks. arXiv preprint arXiv:2202.01653, 2022.
Sandler, Mark , et al., Mobilenetv2: Inverted residuals and linear bottlenecks. In Proceedings of the IEEE conference on computer vision and pattern recognition, pp. 4510-4520, 2018.
Sharma, Vivek, et al., Classification driven dynamic image enhancement. In Proceedings of the IEEE Conference on Computer Vision and Pattern Recognition, pp. 4033-4041, 2018.
Shi, Wenzhe , et al., Real-time single image and video super-resolution using an efficient sub-pixel convolutional neural network. In Proceedings of the IEEE conference on computer vision and pattern recognition, pp. 1874-1883, 2016.
Sun, Chen , et al., Revisiting unreasonable effectiveness of data in deep learning era. In Proceedings of the IEEE international conference on computer vision, pp. 843-852, 2017.
Suzuki, Satoshi , et al., Image pre-transformation for recognition-aware image compression. In 2019 IEEE International Conference on Image Processing (ICIP), pp. 2686-2690. IEEE, 2019.
Szededy, Christian , et al., Rethinking the inception architecture for computer vision. In Proceedings of the IEEE conference on computer vision and pattern recognition, pp. 2818-2826, 2016.
Szegedy, Christian , et al., Going deeper with convolutions. In Proceedings of the IEEE conference on computer vision and pattern recognition, pp. 1-9, 2015.
Talebi, Hossein , et al., Better compression with deep pre-editing. IEEE Transactions on Image Processing, 30:6673-6685, 2021.
Talebi, Hossein , et al., Fast multilayer laplacian enhancement. IEEE Transactions on Computational Imaging, 2(4):496-509, 2016.
Talebi, Hossein , et al., Leaming to resize images for computer vision tasks. In Proceedings of the IEEE/CVF international conference on computer vision, pp. 497-506, 2021.
Talebi, Hossein , et al., Nima: Neural image assessment. IEEE transactions on image processing, 27(8):3998-4011, 2018.
Tan, Mingxing , Efficientnetv2: Smaller models and faster training. In International Conference on Machine Learning, 11 pgs.. PMLR, 2021.
Tan, Mingxing , et al., Efficientnet: Rethinking model scaling for convolutional neural networks. In International conference on machine learning, 10 pgs. PMLR, 2019.
Tao, Xin , et al., Scale-recurrent network for deep image deblurring. In Proceedings of the IEEE conference on computer vision and pattern recognition, pp. 8174-8182, 2018.
Fang, Yuming , et al., "Objective Quality Assessment for Image Retargeting Based on Structural Similarity", IEEE Journal on Emerging and Selected Topics in Circuits and Systems, vol. 4, No. 1, Mar. 2014, pp. 95-105.
You, Junyong , et al., "Transformer for Image Quality Assessment", 2021 IEEE International Conference on Image Processing (ICIP), 2021, 6 pages.

* cited by examiner 102
104
116
118
120
122
108
$106_1$
124
$106_k$
114
Baseline Resizer
$W_1 - W_2$
Baseline Resizer
$W_k - I$
Baseline Resizer
$\alpha_1$
$\beta_1$
$\alpha_k$
$\beta_k$
σ(.)
σ(.)
113
112
110
100

200
202
204
206
208
210
Inputs
Input Embedding
212
Positional Encoding
Multi-Head Attention
216
Add & Norm
Feed Forward
218
Add & Norm
214
Outputs
Output Embedding
220
Positional Encoding
Masked Multi-Head Attention
228
Add & Norm
Multi-Head Attention
230
Add & Norm
Feed Forward
232
Add & Norm
222
Linear
224
Softmax
226
234

Fig. 3

Table 1

| Model | Eval size | Params | FLOPs | Thr (img/s) | IN-1K top-1 acc |
|---|---|---|---|---|---|
| •EffNetV2-S | 384 | 24M | 8.8B | 666.6 | 83.9 |
| •EffNetV2-M | 480 | 55M | 24.0B | 280.7 | 85.1 |
| •ConvNeXt-T | 224 | 29M | 4.5B | 774 | 82.1 |
| •ConvNeXt-S | 224 | 50M | 8.7B | 447.1 | 83.1 |
| •ConvNeXt-B | 224 | 89M | 15.4B | 292.1 | 83.8 |
| •ConvNeXt-L | 224 | 198M | 34.4B | 146.8 | 84.3 |
| ○ViT-B/32 | 384 | 86M | 55.4B | 85.9 | 77.9 |
| ○ViT-B/16 | 384 | 307M | 190.7B | 27.3 | 76.5 |
| ○Swin-T | 224 | 29M | 4.5B | 755.2 | 81.3 |
| ○Swin-S | 224 | 50M | 8.7B | 436.9 | 83.0 |
| ○Swin-B | 224 | 88M | 15.4B | 278.1 | 83.5 |
| ○CSwin-B | 224 | 23M | 4.3B | 701 | 82.7 |
| ○CSwin-B | 224 | 35M | 6.9B | 437 | 83.6 |
| ○CSwin-B | 224 | 78M | 15.0B | 250 | 84.2 |
| ◇CoAtNet-0 | 224 | 25M | 4.2B | 526 | 81.6 |
| ◇CoAtNet-1 | 224 | 25M | 4.2B | 336 | 83.3 |
| ◇CoAtNet-2 | 224 | 75M | 15.7B | 247.7 | 84.1 |
| ◇CoAtNet-3 | 224 | 168M | 34.7B | 163.3 | 84.5 |
| ◇MaxViT-T | 224 | 31M | 5.6B | 350.4 | 83.62 |
| ◇+MULLER$_{512\rightarrow224}$ | 224 | 31M | 5.63B | 349.6 | 83.95 |
| ◇MaxViT-S | 224 | 69M | 11.7B | 242.5 | 84.45 |
| ◇+MULLER$_{512\rightarrow224}$ | 224 | 69M | 11.73B | 241.4 | 84.95 |
| ◇MaxViT-B | 224 | 120M | 23.4B | 133.6 | 84.95 |
| ◇+MULLER$_{512\rightarrow224}$ | 224 | 120M | 23.43B | 133.0 | 85.58 |
| ◇MaxViT-L | 224 | 212M | 43.9B | 99.4 | 85.17 |
| ◇+MULLER$_{512\rightarrow224}$ | 224 | 212M | 43.93B | 99.3 | 85.68 |

ImageNet Top-1 Accuracy [%]
86
85
84
83
82
81
5
10
15
20
25
30
35
40
45
50
FLOPs (B)
MaxViT + MULLER
EffNetV2
MaxViT
CoAtNet
CSwin
ConvNeXt
Swin

Fig. 5

Table 2

| Model | Eval size | Params | FLOPs | IN-1K top-1 acc. | |
|---|---|---|---|---|---|
| | | | | 21K-pt | JFT-pt |
| ●BiT-R-101x3 | 384 | 388M | 204.6B | 84.4 | - |
| ●BiT-R-152x4 | 480 | 937M | 840.5B | 85.4 | - |
| ●EffNetV2-L | 480 | 121M | 53.0B | 86.8 | - |
| ●EffNetV2-XL | 512 | 208M | 94.0B | 87.3 | - |
| ●ConvNeXt-L | 384 | 198M | 101.0B | 87.5 | - |
| ●ConvNeXt-XL | 384 | 350M | 179.0B | 87.8 | - |
| ●NFNet-F4+ | 512 | 527M | 367B | - | 89.20 |
| ○ViT-B/16 | 384 | 87M | 55.5B | 84.0 | - |
| ○ViT-L/16 | 384 | 305M | 191.1B | 85.2 | |
| ○ViT-L/16 | 512 | 305M | 364B | - | 87.76 |
| ○ViT-H/14 | 518 | 632M | 1021B | - | 88.55 |
| ○HaloNet-H4 | 512 | 85M | - | 85.8 | - |
| ○SwinV2-B | 384 | 88M | - | 87.1 | - |
| ○SwinV2-L | 384 | 197M | - | 87.7 | - |
| ◇CvT-W24 | 384 | 277M | 193.2B | 87.7 | - |
| ◇R+ViT-L/16 | 384 | 330M | - | - | 87.12 |
| ◇CoAtNet-3 | 384 | 168M | 107.4B | 87.6 | 88.52 |
| ◇CoAtNet-3 | 512 | 168M | 214B | 87.9 | 88.81 |
| ◇CoAtNet-4 | 512 | 275M | 360.9B | 88.1 | 89.11 |
| ◇MaxViT-B | 224 | 119M | 23.4B | 86.63 | 87.05 |
| ◇+MULLER$_{512\rightarrow224}$ | 224 | 119M | 23.4B | 87.40 | 87.82 |
| ◇+MULLER$_{576\rightarrow288}$ | 288 | 119M | 40.6B | 87.92 | 88.39 |
| ◇MaxViT-L | 224 | 212M | 43.9B | 86.86 | 87.72 |
| ◇+MULLER$_{512\rightarrow224}$ | 224 | 212M | 43.9B | 87.48 | 88.43 |
| ◇+MULLER$_{576\rightarrow288}$ | 288 | 212M | 73.4B | 87.94 | 88.87 |
| ◇MaxViT-XL | 224 | 475M | 97.8B | 87.25 | 88.06 |
| ◇+MULLER$_{512\rightarrow224}$ | 224 | 475M | 97.8B | 87.90 | 88.74 |
| ◇+MULLER$_{576\rightarrow288}$ | 288 | 475M | 162.9B | 88.31 | 89.16 |
| ◇MaxViT-B | 512 | 119M | 138.3B | 88.38 | 88.82 |
| ◇MaxViT-L | 512 | 212M | 245.2B | 88.46 | 89.41 |
| ◇MaxViT-XL | 512 | 475M | 535.2B | 88.70 | 89.53 |

Fig. 6A

Table 3

| Model | Size | FLOPs | top-1 acc. |
| --- | --- | --- | --- |
| EffNet-B0 | 224 | 0.39B | 77.1 |
| + $\text{Talebi}_{512\rightarrow 224}$ | 224 | 2.63B | 77.9 |
| $+\text{MULLER}_{512\rightarrow 224}$ | 224 | 0.42B | 78.2 |
| MobileNet-v2 | 224 | 0.60B | 70.5 |
| + $\text{Talebi}_{512\rightarrow 224}$ | 224 | 2.84B | 71.5 |
| $+\text{MULLER}_{512\rightarrow 224}$ | 224 | 0.63B | 71.8 |
| ResNet-50 | 224 | 6.97B | 75.3 |
| + $\text{Talebi}_{512\rightarrow 224}$ | 224 | 9.33B | 76.2 |
| $+\text{MULLER}_{512\rightarrow 224}$ | 224 | 7.0B | 76.2 |

Fig. 6B

Table 4

| Model | $\alpha_1$ | $\beta_1$ | $\alpha_2$ | $\beta_2$ |
| --- | --- | --- | --- | --- |
| EffNet-B0 | 1.715 | 0.088 | -8.41 | 0.001 |
| MobileNet-v2 | 1.480 | 0.174 | -5.25 | -0.058 |
| ResNet-50 | 1.892 | -0.014 | -11.295 | 0.003 |

Fig. 6C

Table 5

| Model | EffNet-B0 | MobileNet-v2 | ResNet-50 |
|---|---|---|---|
| $MULLER_{EffNet}$ | 78.2 | 71.6 | 75.9 |
| $MULLER_{MobileNet}$ | 78.0 | 71.8 | 76.0 |
| $MULLER_{ResNet}$ | 78.1 | 71.7 | 76.2 |

Fig. 7A

Table 6

| Backbone | Resolution | AP | $AP_{50}$ | $AP_{75}$ | $AP^m$ | $AP^m_{50}$ | $AP^m_{75}$ | FLOPs |
|---|---|---|---|---|---|---|---|---|
| ●ResNet-50 | 1280×800 | 46.3 | 64.3 | 50.5 | 40.1 | 61.7 | 43.4 | 739B |
| ●X101-32 | 1280×800 | 48.1 | 66.5 | 52.4 | 41.6 | 63.9 | 45.2 | 819B |
| ●X101-64 | 1280×800 | 48.3 | 66.4 | 52.3 | 41.7 | 64.0 | 45.1 | 972B |
| ●ConvNeXt-T | 1280×800 | 50.4 | 69.1 | 54.8 | 43.7 | 66.5 | 47.3 | 741B |
| ●ConvNeXt-S | 1280×800 | 51.9 | 70.8 | 56.5 | 45.0 | 68.4 | 49.1 | 827B |
| ●ConvNeXt-B | 1280×800 | 52.7 | 71.3 | 57.2 | 45.6 | 68.9 | 49.5 | 964B |
| ○Swin-T | 1280×800 | 50.4 | 69.2 | 54.7 | 43.7 | 66.6 | 47.3 | 745B |
| ○Swin-S | 1280×800 | 51.9 | 70.7 | 56.3 | 45.0 | 68.2 | 48.8 | 838B |
| ○Swin-B | 1280×800 | 51.9 | 70.5 | 56.4 | 45.0 | 68.1 | 48.9 | 982B |
| ○UViT-T | 896×896 | 51.1 | 70.4 | 56.2 | 43.6 | 67.7 | 47.2 | 613B |
| ○UViT-S | 896×896 | 51.4 | 70.8 | 56.2 | 44.1 | 68.2 | 48.0 | 744B |
| ○UViT-B | 896×896 | 52.5 | 72.0 | 57.6 | 44.3 | 68.7 | 48.3 | 975B |
| ◇MaxViT-T | 640×640 | 49.9 | 69.9 | 54.6 | 42.7 | 66.6 | 46.4 | 379B |
| ◇+$MULR_{896\rightarrow640}$ | 640×640 | 50.5 | 70.7 | 55.0 | 43.1 | 67.0 | 46.7 | 379B |
| ◇MaxViT-S | 640×640 | 50.5 | 70.2 | 55.3 | 43.3 | 67.3 | 46.8 | 432B |
| ◇+$MULR_{896\rightarrow640}$ | 640×640 | 50.8 | 70.4 | 55.5 | 43.5 | 67.7 | 47.1 | 432B |
| ◇MaxViT-B | 640×640 | 51.6 | 71.3 | 56.1 | 44.1 | 68.5 | 47.7 | 543B |
| ◇+$MULR_{896\rightarrow640}$ | 640×640 | 52.3 | 71.5 | 57.0 | 44.7 | 68.9 | 48.7 | 543B |
| ◇MaxViT-T | 896×896 | 52.1 | 71.9 | 56.8 | 44.6 | 69.1 | 48.4 | 475B |
| ◇MaxViT-S | 896×896 | 53.1 | 72.5 | 58.1 | 45.4 | 69.8 | 49.5 | 595B |
| ◇MaxViT-B | 896×896 | 53.4 | 72.9 | 58.1 | 45.7 | 70.3 | 50.0 | 856B |

Fig. 7B

Table 7

| Model | Size | Params | PLCC↑ |
| --- | --- | --- | --- |
| ●NIMA | 224 | 56M | 0.636 |
| ●+ $Talebi_{512\to 224}$ | 224 | 56M | 0.680 |
| ●EffNet-B0 | 224 | 5.3M | 0.642 |
| ●+ $Talebi_{512\to 224}$ | 224 | 5.3M | 0.650 |
| ●AFDC | 224 | 44.5M | 0.671 |
| ○ViT-S/32 | 384 | 22M | 0.665 |
| ○ViT-B/32 | 384 | 88M | 0.664 |
| ○MUSIQ | 224∼512 | 27M | 0.720 |
| ◇MaxViT-T | 224 | 31M | 0.707 |
| ◇+$MULLER_{512\to 224}$ | 224 | 31M | **0.729** |

Fig. 8A

Table 8

| nlayers | ksize | std | Top-1 Acc | FLOPs |
|---|---|---|---|---|
| 2 | 5 | 1.0 | 85.58 | 24.23B |
| 3 | 5 | 1.0 | 85.52 | 24.24B |
| 4 | 5 | 1.0 | 85.50 | 24.25B |
| 6 | 5 | 1.0 | 85.59 | 24.27B |
| 2 | 3 | 1.0 | 85.48 | 24.23B |
| 2 | 7 | 1.0 | 85.57 | 24.24B |
| 2 | 5 | 1.5 | 85.56 | 24.24B |
| 2 | 5 | 2.0 | 85.53 | 24.24B |

Fig. 8B

Table 9

| input size | output size | Top-1 Acc | FLOPs |
|---|---|---|---|
| 384 | 224 | 85.45 | 24.22B |
| 512 | 224 | 85.58 | 24.23B |
| 768 | 224 | 85.56 | 24.26B |
| 512 | 384 | 86.42 | 74.25B |
| 768 | 384 | 86.44 | 74.28B |
| 768 | 512 | 86.68 | 138.57B |
| 1024 | 512 | 86.67 | 138.60B |

Fig. 9A
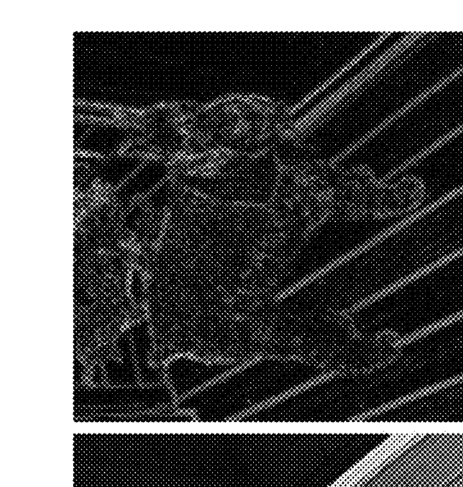
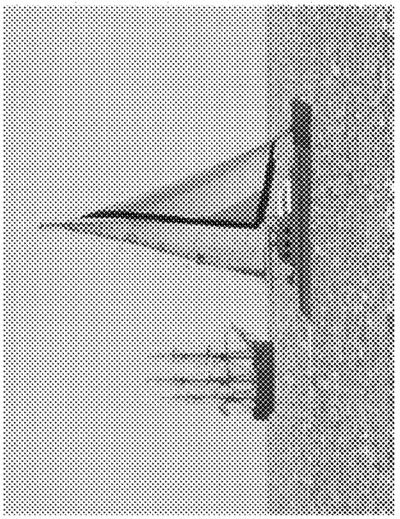
Fig. 9B

Fig. 10

Table 10

| Hyperparameter | ImageNet-1K Pre-train | ImageNet-1K Fine-tune(+MULR) | ImageNet-21K Pre-train | ImageNet-21K Fine-tune(+MULR) | JFT-300M Pre-train | JFT-300M Fine-tune(+MULR) |
|---|---|---|---|---|---|---|
| | (MaxViT-T/S/B/L) | | (MaxViT-B/L/XL) | | (MaxViT-B/L/XL) | |
| Stochastic depth | 0.2/0.3/0.4/0.6 | 0.3/0.5/0.7/0.95 | 0.3/0.4/0.6 | 0.4/0.5/0.9 | 0.0/0.0/0.0 | 0.1/0.2/0.1 |
| Center crop | True | False | True | False | True | False |
| RandAugment | 2, 15 | 2, 15 | 2, 5 | 2, 15 | 2, 5 | 2, 15 |
| Mixup alpha | 0.8 | 0.8 | None | None | None | None |
| Loss type | Softmax | Softmax | Sigmoid | Softmax | Sigmoid | Softmax |
| Label smoothing | 0.1 | 0.1 | 0.0001 | 0.1 | 0 | 0.1 |
| Train epochs | 300 | 30 | 90 | 30 | 14 | 30 |
| Train batch size | 4096 | 512 | 4096 | 512 | 4096 | 512 |
| Optimizer type | AdamW | AdamW | AdamW | AdamW | AdamW | AdamW |
| Peak learning rate | 3e-3 | 5e-5 | 1e-3 | 5e-5 | 1e-3 | 5e-5 |
| Min learning rate | 1e-5 | 5e-5 | 1e-5 | 5e-5 | 1e-5 | 5e-5 |
| Warm-up | 10K steps | None | 5 epochs | None | 20K steps | None |
| LR decay schedule | Cosine | None | Linear | None | Linear | None |
| Weight decay rate | 0.05 | 1e-8 | 0.01 | 1e-8 | 0.01 | 1e-8 |
| Gradient clip | 1.0 | 1.0 | 1.0 | 1.0 | 1.0 | 1.0 |
| EMA decay rate | None | 0.9999 | None | 0.9999 | None | 0.9999 |

Fig. 11

Table 11

| Model | Size | Infer cost (FLOPs) | Train cost (TPUv3 hrs) | top-1 accuracy |
|---|---|---|---|---|
| MaxViT-T | 224 | 5.6B | - | 83.62 |
| +Residual $_{512\rightarrow 224}$ | 224 | 6.8B | 2.8 | 83.93 |
| +MULLER$_{512\rightarrow 224}$ | 224 | 5.6B | 1.9 | 83.95 |
| MaxViT-S | 224 | 11.7B | - | 84.45 |
| +Residual $_{512\rightarrow 224}$ | 224 | 12.9B | 4.2 | 84.95 |
| +MULLER$_{512\rightarrow 224}$ | 224 | 11.7B | 2 | 85.95 |
| MaxViT-B | 224 | 23.4B | - | 84.95 |
| +Residual $_{512\rightarrow 224}$ | 224 | 25.4B | 6 | 85.48 |
| +MULLER$_{512\rightarrow 224}$ | 224 | 23.4B | 3.5 | 85.58 |
| MaxViT-L | 224 | 43.9B | - | 85.17 |
| +Residual $_{512\rightarrow 224}$ | 224 | 45.1B | 7.7 | 85.73 |
| +MULLER$_{512\rightarrow 224}$ | 224 | 43.9B | 5.0 | 85.68 |

Fig. 12A

Table 12

| Model | MaxViT-T | MaxViT-S | MaxViT-B | MaxViT-L |
|---|---|---|---|---|
| $MULLER_{M\text{-}T}$ | 83.95 | 84.91 | 85.61 | 85.68 |
| $MULLER_{M\text{-}S}$ | 83.96 | 84.95 | 85.61 | 85.68 |
| $MULLER_{M\text{-}B}$ | 83.97 | 84.89 | 85.58 | 85.69 |
| $MULLER_{M\text{-}L}$ | 83.95 | 84.91 | 85.61 | 85.68 |

Fig. 12B

Table 13

| Model | Resize method | TPU compilable? | Top-1 acc. |
|---|---|---|---|
| MaxViT-B | Bilinear | Yes | 85.58 |
| | Nearest | Yes | 85.54 |
| | Bicubic | No | - |
| | Lanczos | No | - |

Fig. 13

Table 14

| Anti-aliasing? | Model | $\alpha_1$ | $\beta_1$ | $\alpha_2$ | $\beta_2$ | top-1 acc. |
|---|---|---|---|---|---|---|
| Yes | EffNet-B0 | 1.715 | 0.088 | -8.41 | 0.001 | 78.2 |
| | MobileNet-v2 | 1.480 | 0.174 | -5.25 | -0.058 | 71.8 |
| | ResNet-50 | 1.892 | -0.014 | -11.295 | 0.003 | 76.2 |
| No | EffNet-B0 | 1.632 | -0.014 | -7.265 | 0.026 | 78.2 |
| | MobileNet-v2 | 1.792 | 0.269 | -7.514 | -0.077 | 71.7 |
| | ResNet-50 | 1.687 | -0.039 | -12.637 | 0.015 | 76.2 |

Anti-aliased vs. aliased resize method for MaxViT-B

Anti-aliased vs. aliased resize method for ResNet-50

Default resized
(a) EffNet-B0
(b) MobileNet-V2
(c) ResNet-50
(d) MaxVit-B

Default resized
(a) EffNet-B0
(b) MobileNet-V2
(c) ResNet-50
(d) MaxVit-B 1800
1802
1812
1814
1816
1818
1820
1808
Trained
Model(s)
Trained resizer
1810
1806
Source imagery
1804

Client Device(s)
Processor(s)
Memory
Instructions
Data
Display
User Inputs
1812
Server Computing Device
Processor(s)
Memory
Instructions
Data
1802
Network
1810
Database(s)
1804, 1806, 1808
Client Device(s)
Processor(s)
Memory
Instructions
Data
Display
User Inputs
1814, 1816, 1818, 1820

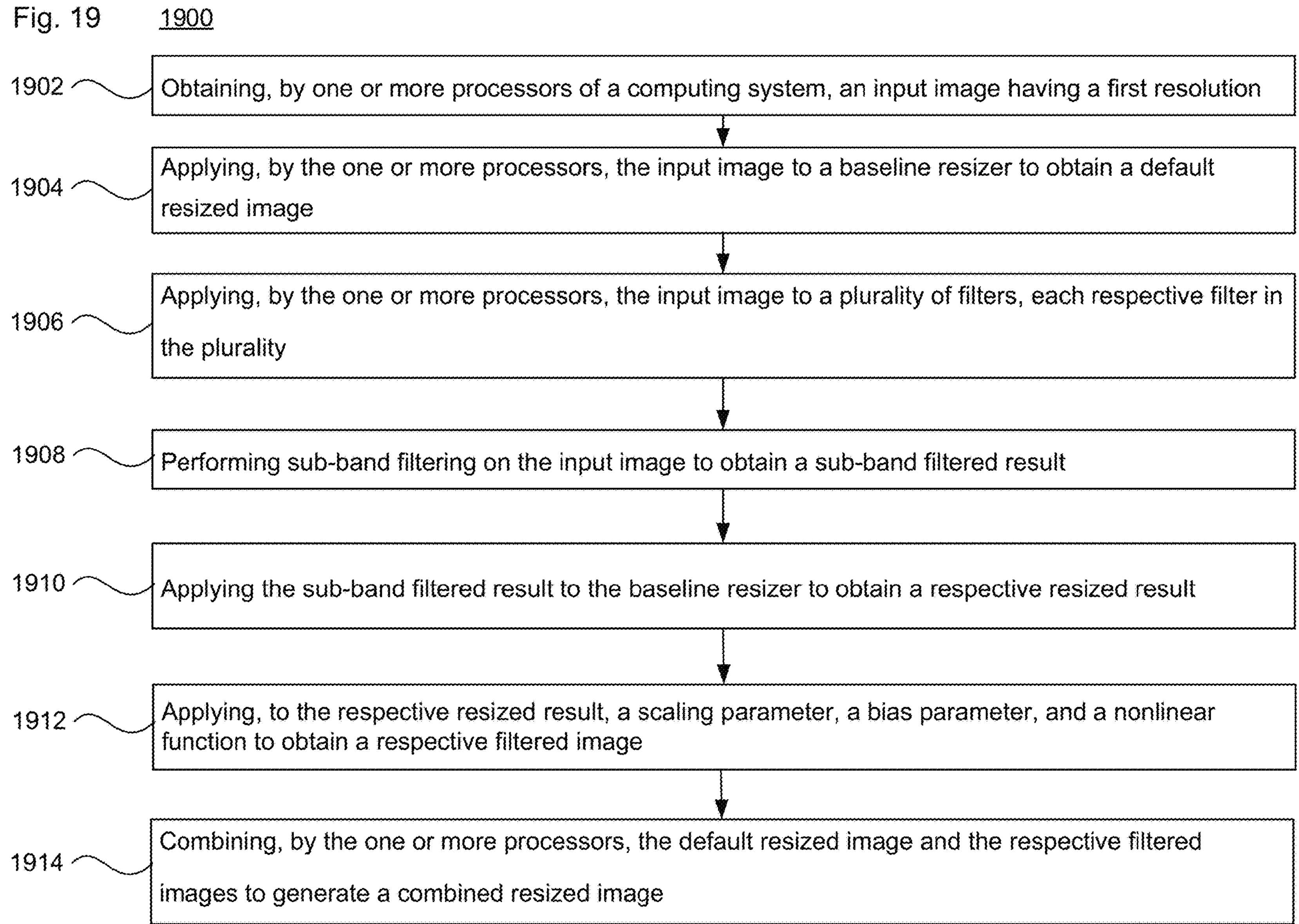
Fig. 19
1900
1902
Obtaining, by one or more processors of a computing system, an input image having a first resolution
1904
Applying, by the one or more processors, the input image to a baseline resizer to obtain a default resized image
1906
Applying, by the one or more processors, the input image to a plurality of filters, each respective filter in the plurality
1908
Performing sub-band filtering on the input image to obtain a sub-band filtered result
1910
Applying the sub-band filtered result to the baseline resizer to obtain a respective resized result
1912
Applying, to the respective resized result, a scaling parameter, a bias parameter, and a nonlinear function to obtain a respective filtered image
1914
Combining, by the one or more processors, the default resized image and the respective filtered images to generate a combined resized image

MULTILAYER LAPLACIAN RESIZER FOR COMPUTER VISION SYSTEMS

CROSS-REFERENCE TO RELATED APPLICATIONS

This application claims priority to and the benefit of the filing date of U.S. Provisional Patent Application No. 63/493,781, filed Apr. 3, 2023, the entire disclosure of which is expressly incorporated by reference herein.

BACKGROUND

Computer vision techniques process imagery to solve problems such as image classification, object detection, video recognition, and image/video generation. These approaches can be applied to many different types of applications, such as detecting and classifying objects for self-driving vehicles, medical imaging, automated manufacturing and warehouse operations, agriculture monitoring, and consumer retail experiences such as self-checkout. Image resizing is a fundamental preprocessing stage utilized in computer vision analysis.

Resizing (or rescaling) refers to the process of changing the resolution of an image, while largely preserving its content for human or machine perception. Image resizing, particularly image down-scaling, is a commonly used pre-processing operation for use in image classification and other image-focused models. Reasons for resizing include, e.g., (1) providing a common spatial resolution for all images in a batch when using a mini-batch gradient descent training scheme, (2) to help reduce computational complexity, making it easier and faster to train and inference neural networks, and large image sizes can lead to slower training and inference, (3) smaller images consume lower memory footprint, enabling stable training of large models like Transformers with larger batch-size, and (4) improving model generalization and robustness by reducing overfitting to specific image size and scales, making the models more flexible and applicable to real-world scenarios. Moreover, the factor of image size may significantly impact the performance of various tasks, particularly those requiring high-resolution prediction. In addition, resizing can be an integral component of remote inference frameworks. For instance, to maintain the bandwidth efficiency of the communication network, before sending an image to a back-end inference server (e.g., a cloud-based inference server) that employs one or more trained image processing models, a thumbnail generator may downscale the image to a fixed resolution (e.g., 480p). The thumbnail generator can be located on the client side (e.g., on a smart phone or tablet computer), or it can be part of a cloud storage system. This means that in most cases the inference server does not have access to the original image, which can adversely impact how it performs image analysis.

Conventional methods such as nearest neighbor, bilinear, and bicubic resizing, are often employed as image resizers for visual recognition systems. These types of techniques may be efficient, and can be flexibly integrated into the training and testing frameworks. However, such techniques were developed long before deep learning became a mainstream solution for visual recognition tasks, and hence are not optimized for and may not be adequate for machine perception in many instances. This could lead to the loss of important visual features or details, which can, sometimes, result in significant performance degradation at the image analysis phase.

Other approaches with learned resizers (or downsamplers) may be employed that leverage deep neural networks to learn image resizing directly from data, which may yield improved performance on several tasks. However, one of the main challenges with such learned resizers is that they can require a large number of parameters and require high computational overhead during training and inference. This can be a bottleneck in remote inference, where the resizer (also known as a thumbnail generator) is not in the inference server, and may have limited computational resources to run a heavy neural net resizer. Additionally, less-bounded resizers may be difficult to transfer to new tasks or datasets due to their excessive model capability.

BRIEF SUMMARY

The technology provides an image resizer that is jointly trainable with neural network classification (recognition) models, and is specifically designed to improve classification performance for such models. The resizer can be trained for a variety of vision tasks including image classification, object detection and segmentation, and image quality assessment. It is designed to improve the performance of classification, detection, segmentation, quality assessment, etc. In particular, systems and methods discussed herein provide an extremely lightweight multilayer Laplacian resizer which utilizes only a few trainable parameters. The resizer has a bandpass nature in that it learns to boost details in certain frequency sub-bands (layers) that benefit the downstream recognition models. For different layers, trainable scaling and bias parameters may be employed to modulate and shift the resized response, and a nonlinearity function is applied on resultant image layers. These layers are added to a baseline layer to obtain a resized image. The resized image can then be applied to a downstream neural network image model in order to perform a selected computer vision task.

According to one aspect of the technology, a computer-implemented image resizing method comprises: obtaining, by one or more processors of a computing system, an input image having a first resolution; applying, by the one or more processors, the input image to a baseline resizer to obtain a default resized image; applying, by the one or more processors, the input image to a plurality of filters, each respective filter in the plurality: performing sub-band filtering on the input image to obtain a sub-band filtered result; applying the sub-band filtered result to the baseline resizer to obtain a respective resized result; and applying, to the respective resized result, a scaling parameter, a bias parameter, and a nonlinear function to obtain a respective filtered image; and combining, by the one or more processors, the default resized image and the respective filtered images to generate a combined resized image.

The respective filtered images from the plurality of filters may be Laplacian residual images. The method may further comprise processing the combined resized image with a trained image processing model to generate a set of output predictions for an image processing task. Alternatively or additionally to any of the above, the scaling parameter may be trained concurrently with an image processing model. Alternatively or additionally to any of the above, the bias parameter may be trained concurrently with an image processing model. Here, the scaling parameter may also be trained concurrently with the image processing model.

Alternatively or additionally to any of the above, the method may be implemented by training an image resizer module concurrently with an image processing model. Alternatively or additionally to any of the above, performing the sub-band filtering may include using a difference of filters to decompose the input image into a set of different detail layers. Alternatively or additionally to any of the above, the sub-band filtering may be performed using a Gaussian kernel as a base filter. The base filter may have a standard deviation of 1.

Alternatively or additionally to any of the above, the nonlinear function may be applied after application of the scaling parameter and the bias parameter. Here, the combined resized image may be a thumbnail image of the input image. In this case, the method may further comprise transmitting the thumbnail image to a remote processing device to perform one or more vision tasks on the thumbnail image. Alternatively or additionally to any of the above, the one or more vision tasks include at least one of image classification, object detection, object segmentation, or image quality assessment.

According to another aspect of the technology, a processing system is provided that comprises memory configured to store imagery, and one or more processors operatively coupled to the memory. The one or more processing are configured to: obtain an input image from the memory, the input image having a first resolution; apply the input image to a baseline resizer to obtain a default resized image; and apply the input image to a plurality of filters. Each respective filter in the plurality is configured to: perform sub-band filtering on the input image to obtain a sub-band filtered result; apply the sub-band filtered result to the baseline resizer to obtain a respective resized result; and apply, to the respective resized result, a scaling parameter, a bias parameter, and a nonlinear function to obtain a respective filtered image. The one or more processors are further configured to combine the default resized image and the respective filtered images to generate a combined resized image.

In one example, the one or more processors are further configured to either store the combined resized image in the memory or to transmit the combined resized image to a remote processing device to perform one or more vision tasks on thereon. Alternatively or additionally to the above, the one or more processors may be further configured to process the combined resized image with a trained image processing model to generate a set of output predictions for an image processing task. Alternatively or additionally to any of the above, at least one of the scaling parameter or the bias parameter is trained concurrently with an image processing model. Alternatively or additionally to any of the above, performance of the sub-band filtering includes use of a difference of filters to decompose the input image into a set of different detail layers.

In one scenario, the combined resized image is a thumbnail image of the input image, the processing system is implemented in a client device, and the processing system is configured to transmit the thumbnail image to a remote server to derive semantic information about the thumbnail image. In another scenario, the combined resized image is a thumbnail image of the input image, the processing system is implemented in a server device, the one or more processors are configured to derive semantic information about the thumbnail image, and the one or more processors are further configured to perform a vision task based on the semantic information.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 illustrates a table of test results in accordance with aspects of the technology.

FIG. 5 illustrates a table of test results in accordance with aspects of the technology.

FIGS. 6A-C illustrate tables of results in accordance with aspects of the technology.

FIGS. 7A-B illustrate tables of test results in accordance with aspects of the technology.

FIGS. 8A-B illustrate tables of test results in accordance with aspects of the technology.

FIGS. 9A-B illustrate visualizations of a learned resizer in accordance with aspects of the technology.

FIG. 10 illustrates a table of test results in accordance with aspects of the technology.

FIG. 11 illustrates a table of test results in accordance with aspects of the technology.

FIGS. 12A-B illustrate tables of results in accordance with aspects of the technology.

FIG. 13 illustrates a table of test results in accordance with aspects of the technology.

FIG. 19 illustrates an example method in accordance with aspects of the technology.

DETAILED DESCRIPTION

Figure 1:
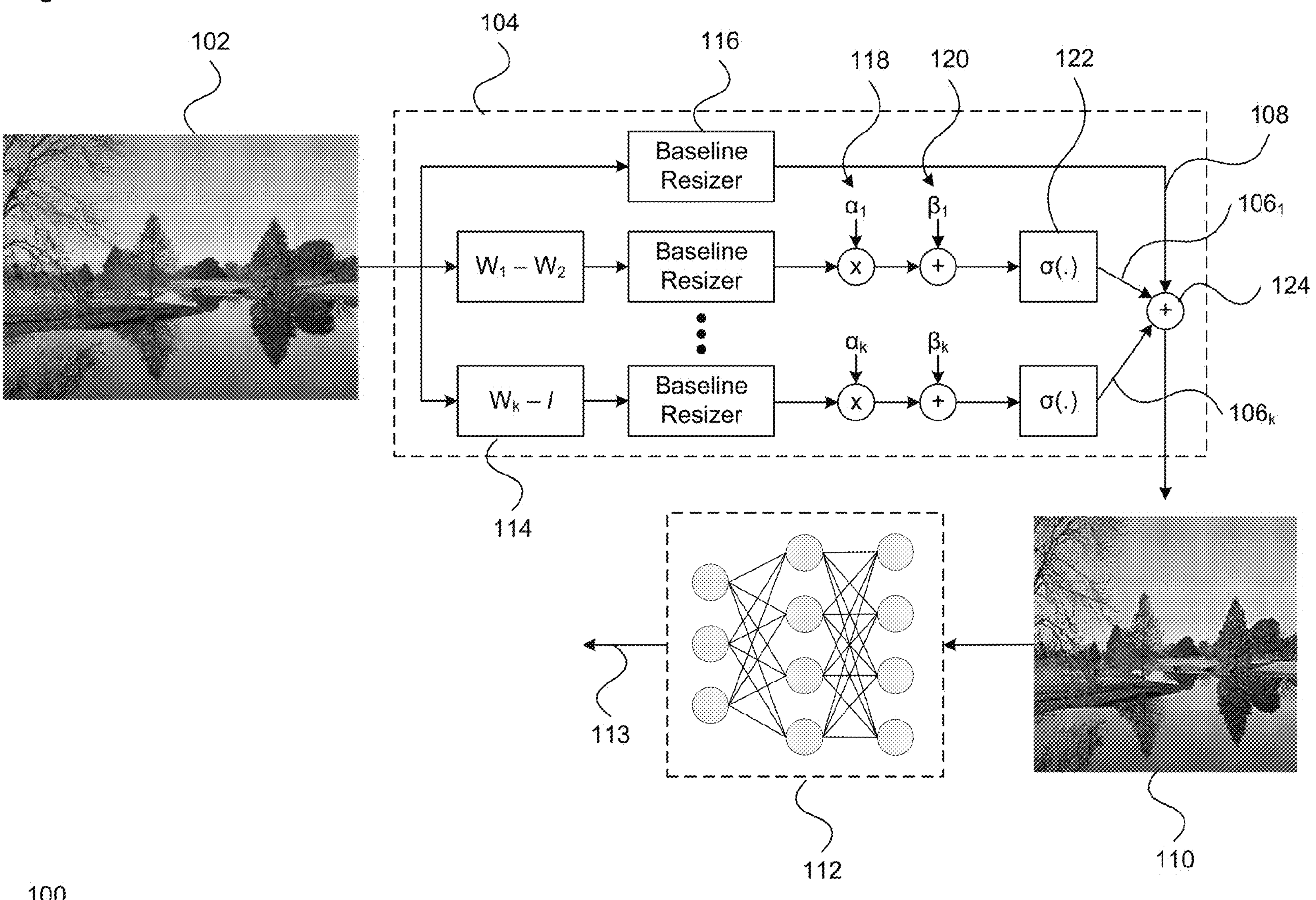
FIG. 1 illustrates a resizer architecture in accordance with aspects of the technology.

As discussed herein, the technology provides a lightweight learned resizer (referenced by "MULLER" in the accompanying appendices and following sections), which operates on multilayer Laplacian decomposition of images as shown in example 100 of FIG. 1. Input image 102 has a particular size (height×width) corresponding resolution. Resizer module 104 decomposes the input image into multiple layers of Laplacian residuals 106 (discussed in detail below), which are then added to a default resized image 108 to obtain a combined resized image 110. This combined resized image 110 can then be applied to a neural network-based image processing model 112 such as a Transformer or convolutional neural network (CNN) model that output predictions 113 for a particular image processing task. The resizing module 104 is jointly trained with the downstream model 112.

This resizer approach requires very few parameters and FLOPs, and thus may incur minimal or otherwise almost no extra training cost, with testing showing that it is able to outperform existing methods in terms of computational efficiency, parameter efficiency, and transferability. For instance, according to one aspect the resizer need only learn a few (e.g., 4) parameters. Moreover, the approach can be used as a direct replacement for conventional resizing functions on various vision tasks involving neural networks such as Transformers and convolutional neural networks (CNNs), including classification, object detection and segmentation, image quality assessment, video recognition, imagery generation, etc., which can result in significant performance improvements without any extra cost.

The following begins with a discussion of the general Transformer approach as an example only, followed by the details regarding the multilayer Laplacian resizer, including experimental results. While the technology can be employed with a Transformer, the resizer can be jointly trained with any vision models, including CNNs, and hybrid models.

General Transformer Approach

Figure 2:
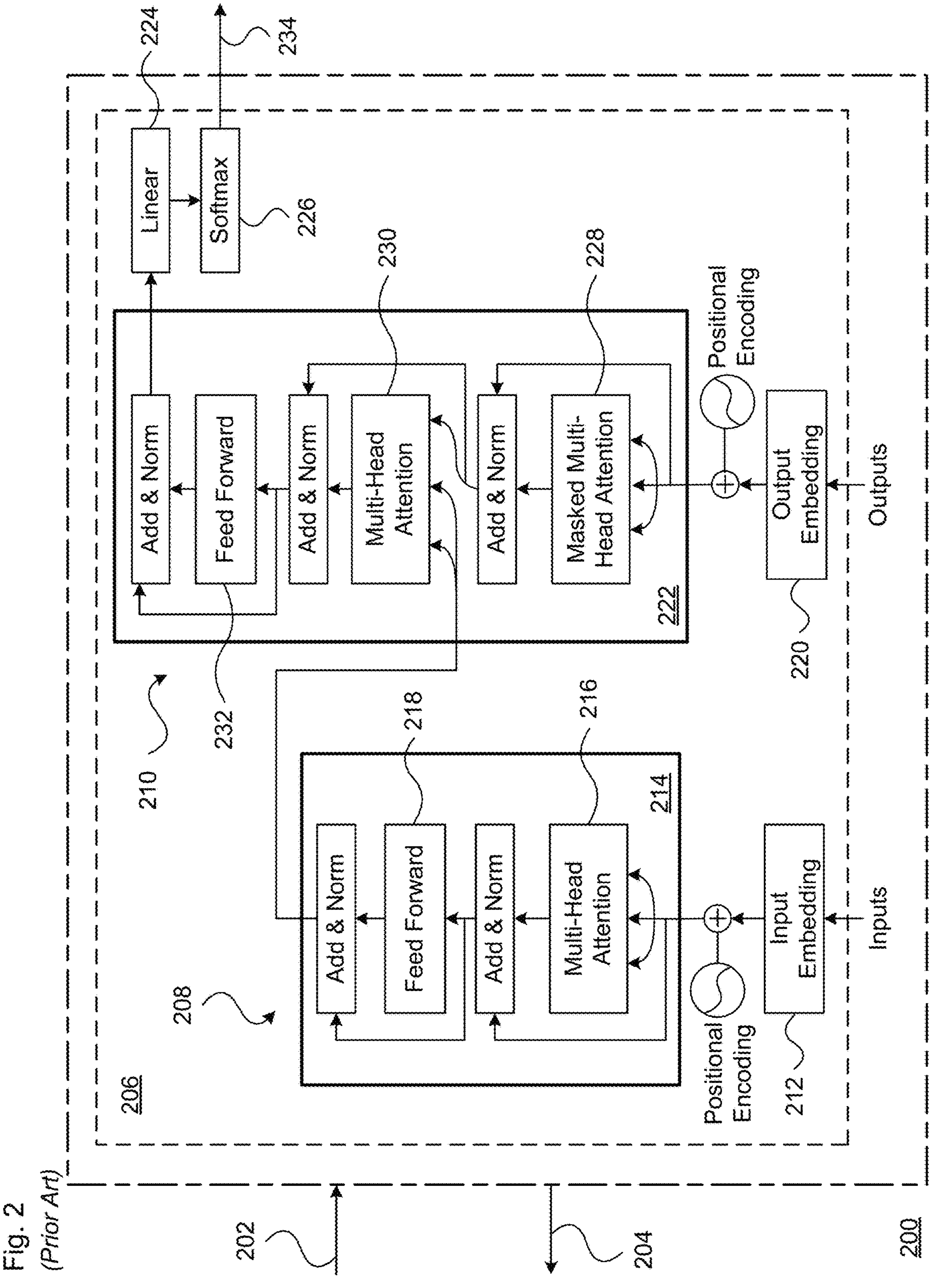
FIG. 2 illustrates a general Transformer architecture for use with aspects of the technology.

The techniques discussed herein may employ a self-attention architecture, e.g., the Transformer neural network encoder-decoder architecture. An exemplary general Transformer-type architecture is shown in FIG. 2, which is based on the arrangement shown in U.S. Pat. No. 10,452,978, entitled "Attention-based sequence transduction neural networks", the entire disclosure of which is incorporated herein by reference. While a Transformer-type architecture may utilize the imagery obtained from the resizer discussed herein, this preprocessing approach may also be utilized with different model architectures including CNNs and other types of neural networks.

System 200 of FIG. 2 is implementable as computer programs by processors of one or more computers in one or more locations. The system 200 receives an input sequence 202 and processes the input sequence 202 to transduce the input sequence 202 into an output sequence 204. The input sequence 202 has a respective network input at each of multiple input positions in an input order and the output sequence 204 has a respective network output at each of multiple output positions in an output order.

System 200 can perform any of a variety of tasks that require processing sequential inputs to generate sequential outputs. System 200 includes an attention-based sequence transduction neural network 206, which in turn includes an encoder neural network 208 and a decoder neural network 210. The encoder neural network 208 is configured to receive the input sequence 202 and generate a respective encoded representation of each of the network inputs in the input sequence. An encoded representation is a vector or other ordered collection of numeric values. The decoder neural network 210 is then configured to use the encoded representations of the network inputs to generate the output sequence 204. Generally, both the encoder 208 and the decoder 210 are attention-based. In some cases, neither the encoder nor the decoder includes any convolutional layers or any recurrent layers. The encoder neural network 208 includes an embedding layer (input embedding) 212 and a sequence of one or more encoder subnetworks 214. The encoder neural 208 network may N encoder subnetworks 214.

The embedding layer 212 is configured, for each network input in the input sequence, to map the network input to a numeric representation of the network input in an embedding space, e.g., into a vector in the embedding space. The embedding layer 212 then provides the numeric representations of the network inputs to the first subnetwork in the sequence of encoder subnetworks 214. The embedding layer 212 may be configured to map each network input to an embedded representation of the network input and then combine, e.g., sum or average, the embedded representation of the network input with a positional embedding of the input position of the network input in the input order to generate a combined embedded representation of the network input. In some cases, the positional embeddings are learned. As used herein, "learned" means that an operation or a value has been adjusted during the training of the sequence transduction neural network 206. In other cases, the positional embeddings may be fixed and are different for each position.

The combined embedded representation is then used as the numeric representation of the network input. Each of the encoder subnetworks 214 is configured to receive a respective encoder subnetwork input for each of the plurality of input positions and to generate a respective subnetwork output for each of the plurality of input positions. The encoder subnetwork outputs generated by the last encoder subnetwork in the sequence are then used as the encoded representations of the network inputs. For the first encoder subnetwork in the sequence, the encoder subnetwork input is the numeric representations generated by the embedding layer 212, and, for each encoder subnetwork other than the first encoder subnetwork in the sequence, the encoder subnetwork input is the encoder subnetwork output of the preceding encoder subnetwork in the sequence.

Each encoder subnetwork 214 includes an encoder self-attention sub-layer 216. The encoder self-attention sub-layer 216 is configured to receive the subnetwork input for each of the plurality of input positions and, for each particular input position in the input order, apply an attention mechanism over the encoder subnetwork inputs at the input positions using one or more queries derived from the encoder subnetwork input at the particular input position to generate a respective output for the particular input position. In some cases, the attention mechanism is a multi-head attention mechanism as shown. In some implementations, each of the encoder subnetworks 214 may also include a residual connection layer that combines the outputs of the encoder self-attention sub-layer with the inputs to the encoder self-attention sub-layer to generate an encoder self-attention residual output and a layer normalization layer that applies layer normalization to the encoder self-attention residual output. These two layers are collectively referred to as an "Add & Norm" operation in FIG. 2.

Some or all of the encoder subnetworks can also include a position-wise feed-forward layer 218 that is configured to operate on each position in the input sequence separately. In particular, for each input position, the feed-forward layer 218 is configured receive an input at the input position and apply a sequence of transformations to the input at the input position to generate an output for the input position. The inputs received by the position-wise feed-forward layer 218 can be the outputs of the layer normalization layer when the residual and layer normalization layers are included or the outputs of the encoder self-attention sub-layer 216 when the residual and layer normalization layers are not included. The transformations applied by the layer 218 will generally be the same for each input position (but different feed-forward layers in different subnetworks may apply different transformations).

In cases where an encoder subnetwork 214 includes a position-wise feed-forward layer 218 as shown, the encoder subnetwork can also include a residual connection layer that combines the outputs of the position-wise feed-forward layer with the inputs to the position-wise feed-forward layer to generate an encoder position-wise residual output and a layer normalization layer that applies layer normalization to the encoder position-wise residual output. As noted above, these two layers are also collectively referred to as an "Add & Norm" operation. The outputs of this layer normalization layer can then be used as the outputs of the encoder subnetwork 214.

Once the encoder neural network 208 has generated the encoded representations, the decoder neural network 210 is configured to generate the output sequence in an auto-regressive manner. That is, the decoder neural network 210 generates the output sequence, by at each of a plurality of generation time steps, generating a network output for a corresponding output position conditioned on (i) the encoded representations and (ii) network outputs at output positions preceding the output position in the output order. In particular, for a given output position, the decoder neural network generates an output that defines a probability distribution over possible network outputs at the given output position. The decoder neural network can then select a network output for the output position by sampling from the probability distribution or by selecting the network output with the highest probability.

Because the decoder neural network 210 is auto-regressive, at each generation time step, the decoder network 210 operates on the network outputs that have already been generated before the generation time step, i.e., the network outputs at output positions preceding the corresponding output position in the output order. In some implementations, to ensure this is the case during both inference and training, at each generation time step the decoder neural network 210 shifts the already generated network outputs right by one output order position (i.e., introduces a one position offset into the already generated network output sequence) and (as will be described in more detail below) masks certain operations so that positions can only attend to positions up to and including that position in the output sequence (and not subsequent positions). While the remainder of the description below describes that, when generating a given output at a given output position, various components of the decoder 210 operate on data at output positions preceding the given output positions (and not on data at any other output positions), it will be understood that this type of conditioning can be effectively implemented using shifting.

The decoder neural network 210 includes an embedding layer (output embedding) 220, a sequence of decoder subnetworks 222, a linear layer 224, and a softmax layer 226. In particular, the decoder neural network can include N decoder subnetworks 222. However, while the example of FIG. 2 shows the encoder 208 and the decoder 210 including the same number of subnetworks, in some cases the encoder 208 and the decoder 210 include different numbers of subnetworks. The embedding layer 220 is configured to, at each generation time step, for each network output at an output position that precedes the current output position in the output order, map the network output to a numeric representation of the network output in the embedding space. The embedding layer 220 then provides the numeric representations of the network outputs to the first subnetwork 222 in the sequence of decoder subnetworks.

In some implementations, the embedding layer 220 is configured to map each network output to an embedded representation of the network output and combine the embedded representation of the network output with a positional embedding of the output position of the network output in the output order to generate a combined embedded representation of the network output. The combined embedded representation is then used as the numeric representation of the network output. The embedding layer 220 generates the combined embedded representation in the same manner as described above with reference to the embedding layer 212.

Each decoder subnetwork 222 is configured to, at each generation time step, receive a respective decoder subnetwork input for each of the plurality of output positions preceding the corresponding output position and to generate a respective decoder subnetwork output for each of the plurality of output positions preceding the corresponding output position (or equivalently, when the output sequence has been shifted right, each network output at a position up to and including the current output position). In particular, each decoder subnetwork 222 includes two different attention sub-layers: a decoder self-attention sub-layer 228 and an encoder-decoder attention sub-layer 230. Each decoder self-attention sub-layer 228 is configured to, at each generation time step, receive an input for each output position preceding the corresponding output position and, for each of the particular output positions, apply an attention mechanism over the inputs at the output positions preceding the corresponding position using one or more queries derived from the input at the particular output position to generate a updated representation for the particular output position. That is, the decoder self-attention sub-layer 228 applies an attention mechanism that is masked so that it does not attend over or otherwise process any data that is not at a position preceding the current output position in the output sequence.

Each encoder-decoder attention sub-layer 230, on the other hand, is configured to, at each generation time step, receive an input for each output position preceding the corresponding output position and, for each of the output positions, apply an attention mechanism over the encoded representations at the input positions using one or more queries derived from the input for the output position to generate an updated representation for the output position. Thus, the encoder-decoder attention sub-layer 230 applies attention over encoded representations while the decoder self-attention sub-layer 228 applies attention over inputs at output positions.

In the example of FIG. 2, the decoder self-attention sub-layer 228 is shown as being before the encoder-decoder attention sub-layer in the processing order within the decoder subnetwork 222. In other examples, however, the decoder self-attention sub-layer 228 may be after the encoder-decoder attention sub-layer 230 in the processing order within the decoder subnetwork 222 or different subnetworks may have different processing orders. In some implementations, each decoder subnetwork 222 includes, after the decoder self-attention sub-layer 228, after the encoder-decoder attention sub-layer 230, or after each of the two sub-layers, a residual connection layer that combines the outputs of the attention sub-layer with the inputs to the attention sub-layer to generate a residual output and a layer normalization layer that applies layer normalization to the residual output. These two layers being inserted after each of the two sub-layers, both referred to as an "Add & Norm" operation.

Some or all of the decoder subnetwork 222 also include a position-wise feed-forward layer 232 that is configured to operate in a similar manner as the position-wise feed-forward layer 218 from the encoder 208. In particular, the layer 232 is configured to, at each generation time step: for each output position preceding the corresponding output position: receive an input at the output position, and apply a sequence of transformations to the input at the output position to generate an output for the output position. The inputs received by the position-wise feed-forward layer 232 can be the outputs of the layer normalization layer (following the last attention sub-layer in the subnetwork 222) when the residual and layer normalization layers are included or the outputs of the last attention sub-layer in the subnetwork 222 when the residual and layer normalization layers are not included. In cases where a decoder subnetwork 222 includes a position-wise feed-forward layer 232, the decoder subnetwork can also include a residual connection layer that combines the outputs of the position-wise feed-forward layer with the inputs to the position-wise feed-forward layer to generate a decoder position-wise residual output and a layer normalization layer that applies layer normalization to the decoder position-wise residual output. These two layers are also collectively referred to as an "Add & Norm" operation. The outputs of this layer normalization layer can then be used as the outputs of the decoder subnetwork 222.

At each generation time step, the linear layer 224 applies a learned linear transformation to the output of the last decoder subnetwork 222 in order to project the output of the last decoder subnetwork 222 into the appropriate space for processing by the softmax layer 226. The softmax layer 226 then applies a softmax function over the outputs of the linear layer 224 to generate the probability distribution (output probabilities) 234 over the possible network outputs at the generation time step. The decoder 210 can then select a network output from the possible network outputs using the probability distribution.

Multilayer Resizer (MULLER)

Returning to FIG. 1, the resizer module 104 is now discussed in detail. One goal is to keep the computational cost as low as possible such that it can replace existing resizers (e.g., bilinear resizers) without extra cost. As will be demonstrated below via the test results, there is also is a notable performance gain over conventional approaches. The present resizer approach can be orders of magnitude faster than existing techniques, and is more scalable (e.g., to large image size). It utilizes only a few parameters, which allows for better generalization with different types of image processing systems. In addition, it adds almost no extra training cost to the system. It is shown that with learning merely a couple of parameters, training with the resizer module 104 performs as effectively as having a heavy downscaling network with several thousand parameter counts.

Image resizing models can be generally formulated as:

$$y = F_2(R(F_1(x); h', w')),$$

where R maps the input image x of size h×w to an output image size of h'×w' by computing the pixel values at the target spatial locations. $F_1$ and $F_2$ denote optional pre- and post-filtering operations. Typically, $F_1$ and $F_2$ can be identity functions, and R is chosen as a simple interpolation method like nearest-neighbor, bilinear, or bicubic. To learn more powerful resizing, learned resizers have been proposed by applying a base resizer on intermediate neural activations, wherein $F_1$ and $F_2$ are two designed CNNs applied at the original and output resolutions, respectively. Despite showing promising performance, however, such resizers may typically suffer from high computational complexity, and thus their net performance gain might be compromised in terms of the overall inference cost.

The present approach uses multilayer Laplacian decomposition, which is able to achieve "bandpassed" detail and texture manipulation with only a few learnable parameters. The resizer module 104 of FIG. 1 has the following form:

$$z = R(x) + \sum_{l=1}^{k} \sigma(\alpha_l(R((W_l - W_{l+1})x) + \beta_l)$$

where R denotes a base resizer (e.g., a bilinear resizer, although other base resizer types can be employed) and $\{W_1, W_2, \ldots, W_k\}$ represents the low-pass filter basis.

$W_l$ is defined as a positive row-stochastic matrix of size n×n, with n representing the number of pixels in the vectorized input image x. Here, $W_{k+1}$=I, where I is the identity matrix. Each layer in the equation for z uses a difference of the filters to decompose the image into different detail layers (bandpass filtering), as shown at blocks 114 in FIG. 1. These layers desirably operate in parallel with one another and with the baseline resizing. Without loss of generality, the Gaussian kernel can be chosen as the base filter, the filter bank can be generated by an iterative application of the same base filter as $W_l=W^{k-l+1}$, with W being a Gaussian filter with standard deviation 1. Note that any low pass filter could be used in place of W.

Note that the iterative application of the low-pass filter results in a smoother image. The filtered subband image $(W_l-W_{l+1})x$ in branch l is fed into the same base resizer 116 to produce the target resolution layer. Trainable scaling (α at 118) and bias (β at 120) parameters are added per layer to modulate and shift the resized response. Then, a nonlinearity function σ at blocks 122 (e.g., tan h or another type of nonlinear function such as an S-curve) is applied on the resulting image layer. Finally, the output from each block 122 is added at 124 to the base resized image 108 received directly from the baseline resizer 116 as show via the top pipeline. Note that the scaling factor $\alpha_l$ controls the amount of detail boosted or suppressed in the l layers of the resizer, and the bias parameter $\beta_l$ controls the mean shift.

In this framework, only the scalar and the bias values in the residual layers are trainable, meaning that for k=3, there are only six trainable parameters, and the overall computational cost is only applying 4 bilinear (or other baseline) resizers and 3 Gaussian filters. Note that the term "Laplacian" refers to an interpretation of the filtering structure in FIG. 1 that can be written as a summation of Laplacian operators, namely $L_l=I-W_l$. More explicitly, for a linear activation, the resulting image y can be expressed as a Laplacian form:

$$y = \gamma_0 R(x) + \gamma_1 R(L_1 x) + \ldots + \gamma_k R(L_k x) + \delta$$

Here, γ and δ are a constants that are directly dependent on α and β. For example, $\gamma_0$=1, $\gamma_l$=alpha$_{\{l-1\}}$−alpha$_l$, and $\delta=\beta_1+\ldots+\beta_k$. Note that this approach is not limited to downscaling. Thus, should the original image data be of a low resolution below some threshold, then this module can learn to upscale the image to a higher resolution. And while FIG. 1 is illustrated with use on a single image, the approach can also be used for video imagery.

Testing and Evaluation

Performance of the (MULLER) resizer module described above was tested on several competitive vision tasks on which resolution plays an important role on performance, including image classification, object detection and segmentation, and image quality assessment. In order to identify the impact of the resizer module, our main experiments include the vision Transformer model MaxViT as the baseline, which is described in "Maxvit: Multi-axis vision transformer" by Tu et al., 2022, the entire disclosure of which is incorporated herein by reference.

The performance of this baseline model was demonstrated by co-training it with the resizer module. It will be seen that the resizer module can be effective with other backbones such as ResNet (see, e.g., "Deep residual learning for image recognition" by He et al., 2016), MobileNet-v2 (see, e.g., "Mobilenetv2: Inverted residuals and linear bottlenecks" by Sandler et al., 2018) and EfficientNet-B0 or EffNetV2 (see, e.g., "Efficientnet: Rethinking model scaling for convolutional neural networks" by Tan et al., 2019". In all such experiments, 2 layers were used in the resizer module with Gaussian kernel size 5 and standard deviation 1. Tensorflow's default resizer was used as the base resizer.

The efficacy of the resizer module was demonstrated on the standard, but most competitive ImageNet-1K classification task. The MaxViT Transformer was used as the backbone model, which was pre-trained on ImageNet-1K at 224×224 resolution for 300 epochs. Instead of directly fine-tuning at higher resolution (e.g., 384 or 512), the backbone was jointly finetuned with the resizer module plugged before the stem layers. The input and output resolutions were set at 512 and 224 for the resizer module in the ImageNet experiments.

The main test results on ImageNet-1K classification are shown in Table 1 of FIG. 3. The resizer module described above is identified as MULLER in Table 1. Note that comparison models were trained to their highest possible accuracy. In the table, $\text{MULLER}_{A\rightarrow B}$ denote that the resizer module resizes from A to B, where the backbone takes images of size B. FLOPs counts the total computation of the resizer and backbone. Throughput (Thr) is measured on a single V100 GPU with batch size 16. In addition, the symbols ●, ○, and ◇ denote ConvNets, Transformers, and hybrid models, respectively.

Figure 4A:
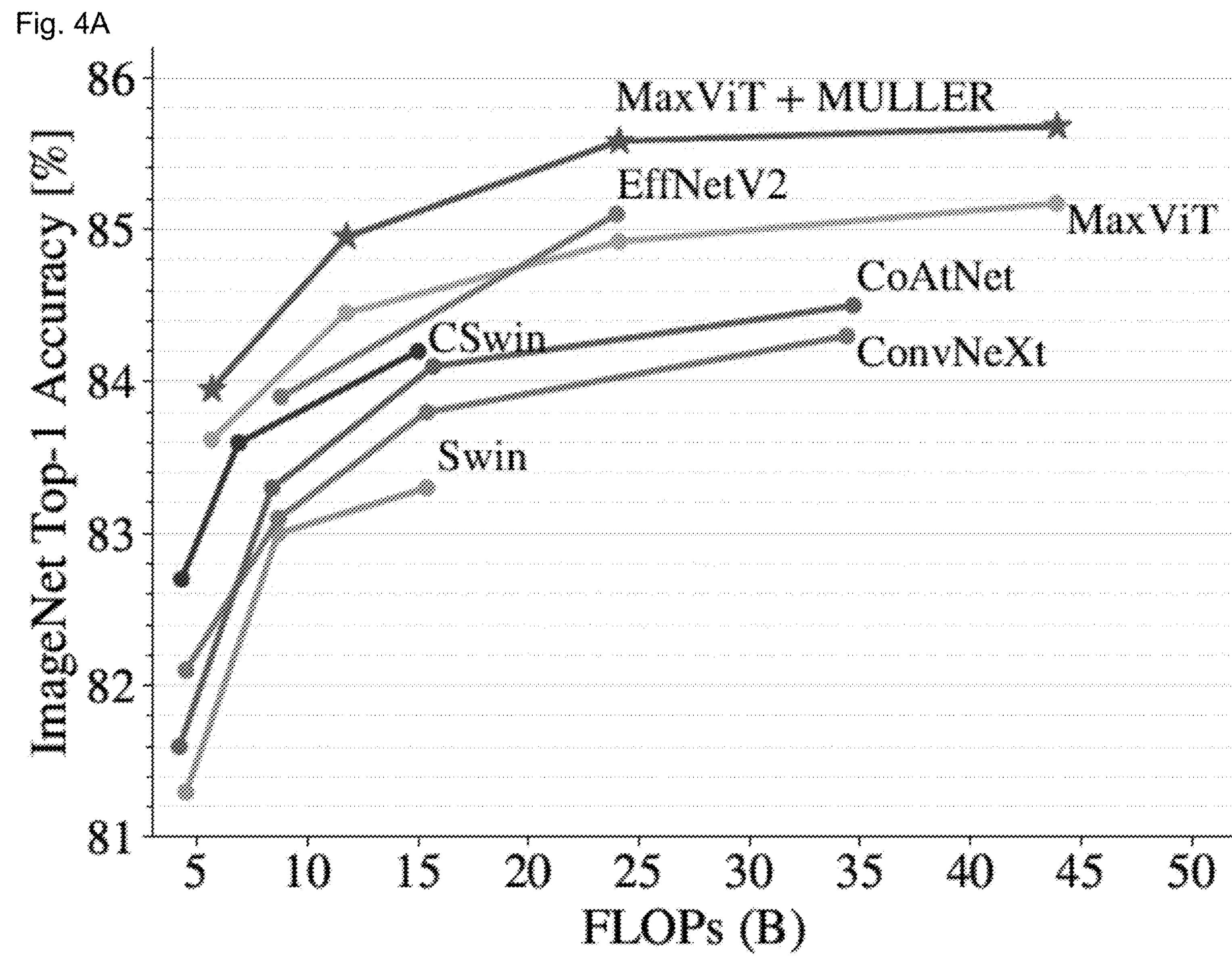
FIGS. 4A-B are charts of test results in accordance with aspects of the technology.
Figure 4B:
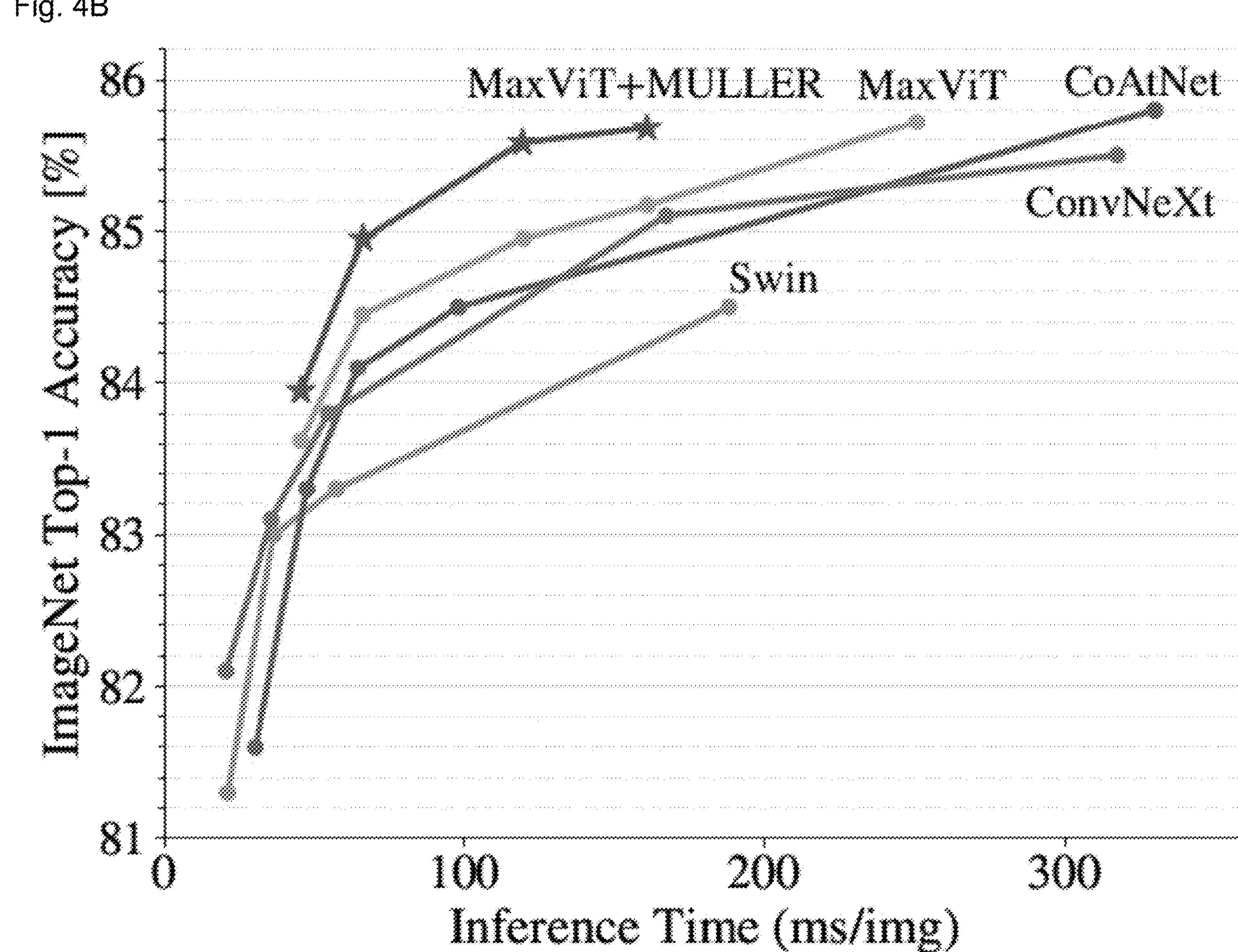

For better visualization, the accuracy vs. FLOPs and accuracy vs. inference-latency scaling curves are illustrated in the plots of FIGS. 4A and 4B, respectively. As may be seen, MaxViT powered by the MULLER resizer module sets a new state-of-the-art top-1 accuracy of 85.68% with only 43.9 B FLOPs among all the compared models trained at 224×224. The MULLER resizer module improves at an average of 0.49 accuracy across the four MaxViT variants. In terms of actual inference time, MaxViT with MULLER exceeds among all the models trained at various resolution. Equivalently, it can save 36% latency to achieve on the order of 85.7% accuracy.

To demonstrate the scaling properties of the resizer module with respect to data size, Table 2 in FIG. 5 presents the results of models pre-trained on ImageNet-21K and JFT-300M (see, e.g., "Revisiting unreasonable effectiveness of data in deep learning area" by Sun et al, 2017), respectively. This table presents results using two different settings: $\text{MULLER}_{512\rightarrow 224}$ and $\text{MULLER}_{576\rightarrow 288}$ respectively, as it is observed that on larger models and larger training sets, the backbone benefits more by seeing larger inputs. It can be seen that with ImageNet-21k pretraining, the finetuned MaxViT with $\text{MULLER}_{512\rightarrow 224}$ gains 0.8%, 0.6%, and 0.7% accuracy over directly finetuning without resizer for B, L, and XL models, respectively. Similarly, for JFT-300M pretraining, those numbers are 0.8%, 0.7%, and 0.7%. It indicates that when finetuning with MULLER, MaxViT scales consistently when data size increases from ImageNet-1k up to JFT-300M.

It is further observed that for larger models and larger training sets, the backbone can benefit even more through seeing larger input images, as illustrated with the performance of training with $\text{MULLER}_{576\rightarrow 288}$. One can see that it further boosts the performance by an average of 0.4~0.5% across the board for both 21K and JFT. Remarkably, MaxViT-XL with $\text{MULLER}_{576\rightarrow 288}$ achieves 89.16% top-1 accuracy with only 162.9 B FLOPs.

Testing also examined the generalization of the resizer across different model variants. It was found that the learned weights in MULLER are very close across different variants, and the transferring results are as effective as the original training.

To explore the resizer beyond the MaxViT architecture, some widely used backbones were selected including ResNet-50, EfficientNet-B0, and MobileNetv2]. These results are presented in Table 3 of FIG. 6A. Comparisons were also made with the resizer described in "Learning to resize images for computer vision tasks" by Talebi et al, 2021 (the Talebi resizer). It can be observed that the MULLER resizer module improves the performance of the baseline backbones consistently. Also compared to the approach described in "Efficientnet: Rethinking model scaling for convolutional neural networks" ("EffNet-B0" in the table), the MULLER resizer module requires a significantly lower number of FLOPs (two orders-of-magnitude), and in some cases such as MobileNet-v2 and EfficientNet-B0 it outperforms the approach described in the Talebi article. These results also indicate that the MULLER resizer module improves over baseline resizers low the FLOPs regime as well.

In order to examine the generalizability of the MULLER resizer module, classification models were evaluated with resizers that were trained with other backbones. To this end, the learned resizer parameters are first presented for each backbone, and then the classification performances are discussed with respect to the results in Table 4 of FIG. 6B, which represent the learned MULLER parameters for each backbone model trained on ImageNet-1k. It is observed that (1) performance of the classification models are more sensitive to $\alpha_1$ than $\alpha_2$, and (2) the learned bias values are relatively small, meaning the resizer does not significantly shift the mean of each residual image layer. Note that $|\alpha_l|>1$ means the image details represented by the l-th layer are boosted, whereas $|\alpha_l|<1$ has the opposite effect.

To quantify generalizability of the resizer, the learned parameters in Table 4 were used to evaluate different backbones. As for different backbones, Table 5 in FIG. 6C shows that one model leads to classification performance that is in the average proximity of 0.15 from the best top-1 accuracy. This may be explained by the fact that the MULLER resizer module approach is a constrained model with only 4 trainable parameters. Also, it is important to highlight that in contrast to the Talebi resizer, MULLER does not require fine-tuning.

It has been shown that aliasing may impact the performance of some deep vision models. The results presented here are based on anti-aliased images. More specifically, the AREA downscaling method was used in TensorFlow to produce 5122 inputs to MULLER. It is observed that while removing anti-aliasing does not hamper the overall performance gain obtained by MULLER, the learned parameters may differ from those in Table 5.

Object Detection and Instance Segmentation

The performance of MULLER was evaluated on COCO2017 (see, e.g., "Microsoft coco: Common objects in context" by Lin et al, 2014) for object bounding box detection and instance segmentation tasks with a two-stage cascaded Mask-RCNN framework (see, e.g., "Faster r-cnn: Towards real-time object detection with region proposal networks" by Ren et al., 2015). The MaxViT backbone was warm-started using checkpoints pretrained on ImageNet-1K, then the whole model including the resizer was finetunes on COCO2017. Table 6 of FIG. 7A presents a comparison of two-stage object detection and instance segmentation, summarizing the object detection and instance segmentation results comparing state-of-the-art ConvNets and vision Transformers. AP and $AP^m$ denote box and mask average precision. These results report the train and evaluation resolutions as well as their corresponding FLOPs as reference for model complexity. It may be seen that MaxViT suffers from noticeable performance drop if training resolution is lower. However, it is observed that training with the MULLER resizer can further improve the performance across the board. Specifically, on MaxViT-B at 640×640, finetuning with MULLER gained 0.7 AP and 0.6 mask AP on the COCO validation set without any FLOPs overhead.

Image Quality Assessment

For image quality assessment, the experiment was based on the AVA dataset, which includes approximately 250,000 images rated by amateur photographers. Each image in the dataset is associated with a histogram of ratings from an average of 200 raters. Image quality and aesthetic assessment is a task that is sensitive to downscaling, as downscaling may negatively impact visual quality attributes such as sharpness. The Earth Mover's Distance (EMD) was used as the training loss. These results are shown in Table 7 of FIG. 7B. The Pearson linear correlation coefficient (PLCC) of the predicted and ground truth mean ratings is presented as the evaluation metric. As can be seen, the MULLER resizer approach improved the performance of MaxViT beyond the existing methods such as MUSIQ. Note that in contrast to MUSIQ, which uses multi-scale input augmentations, MULLER+MaxViT only required a single low-resolution input from the resizer.

Hyperparameters

According to one aspect of the technology, there are several hyperparameters that may be used in the design of the resizer module discussed here. These include {k, hsize, stddev} which respectively denote the number of layers, the kernel size of the Gaussian filters $\{W_1, W_2, \ldots, W_k\}$, and the standard deviation of the Gaussian filters. To understand the effect of these hyperparameters, an ablation study was conducted, the results of which are shown in Table 8 of FIG. 8A. As shown in this table, the MULLER resizer approach is quite insensitive to the selection of parameters; therefore, a simple set of parameters may be used to save computational resources.

Effects of Image Size

It is known that image size can significantly affect the recognition performance. In view of this, the effect of varying input and output sizes of the MULLER approach was evaluated using MaxViT-B, the results of which are shown in Table 9 of FIG. 8B. Note that the output size of MULLER is indeed the size seen by the backbone, so higher output size typically corresponds to improved accuracy. It is observed that using higher input resolutions (e.g., 3×) for MULLER does not yield any further performance gain beyond the baseline setting. Nonetheless, adopting a reasonably large resolution (e.g., 1.6~2.5×) can achieve the expected performance.

Visualization of the behavior of the learned resizer is illustrated in the two sets of images in FIGS. 9A-B. In particular, these are visualizations of the learned MULLER resizer for ResNet-50. Here, the default resizer is an (anti-aliased) AREA resizer in Tensorflow. The rightmost image (Difference) shows the difference of the learned and the default resizers As can be seen, the MULLER resizer is learned to boost details or textures of the images, while also enhancing the image contrast. These effects can preserve more visual information in the downscaled images over naive resizing, thus making the classification model learn better. The MULLER resizer approach achieves a balance of human and machine perceptual qualities, due to the strong regularization imbued in its Laplacian-inspired design.

Additional Testing

The following provides additional results for (1) detailed experimental settings and hyperparameters for image classification, object detection and segmentation, and image quality experiments, (2) resizer comparisons to other known techniques, (3) the anti-aliasing effect, and (4) visualizations for different types of images.

We provide the experimental settings for both pre-training and fine-tuning MaxViT models on ImageNet-1K, detailed in Table 10 of FIG. 10. All the MaxViT variants employed similar hyperparameters except that the stochastic depth rate was tuned for each setting. It should be noted that the backbone was pre-trained on ImageNet-1k/-21k/JFT with 300/90/14 epochs at a resolution of 224×224. Subsequently, the backbone was jointly fine-tuned with MULLER plugged-in at a higher resolution for an additional 30 epochs. In the table, multiple values separated by '/' are for each model size respectively.

For object detection and segmentation, MaxViT was evaluated on the COCO2017 object bounding box detection and instance segmentation task. The dataset comprises approximately 118,000 training and 5,000 validation samples. All MaxViT backbones were pretrained on the ImageNet-1k dataset at a resolution of 224×224. These pretrained checkpoints were then used as the warm-up weights for fine-tuning on the detection and segmentation tasks. Note that for both tasks, the input images were resized to 896×896 before being fed into the MULLER resizer module. The backbone received 640×640 resolution images for generating the box proposals. The training was conducted with a batch size of 256, using the AdamW optimizer with learning rate of 3e-3, and stochastic depth of 0.3, 0.5, 0.8 for MaxViT-T/S/B backbones, respectively.

For image quality assessment, the MaxViT model was trained and evaluated on the AVA benchmark. MaxViT was pretrained for resolution at 224×224. Then the model was initialized with ImageNet-1K 224_224 pre-trained weights and fine-tuned with the MULLER resizer module. The weight and bias momentums were set to 0.9, and a dropout rate of 0.75 was applied on the last layer of the baseline network. An initial learning rate of 1e-3, exponentially decayed with decay factor 0.9 every 10 epochs, was used. The stochastic depth rate was set to 0.5.

Table 11 in FIG. 11 provides comparisons to the Talebi resizer with residual convolution blocks (shown as $\text{Residual}_{512\rightarrow224}$ in the table). As shown, fine-tuning with the MULLER resizer approach performs as effectively as, and sometimes better than the previous heavier residual resizer. Furthermore, it is noted that MULLER is two orders-of-magnitude cheaper in terms of inference cost (FLOPs), which may further save up to 52% training cost on TPUs, depending on the model size. Thus, the MULLER approach can be easily integrated into various applications without incurring additional costs.

Table 12 in FIG. 12A presents results that examine the generalization ability of the learned resizer across different MaxViT model variants. Specifically, the learned resizer parameters were taken from one MaxViT variant, and directly tested on another variant. As can be seen in this table, the learned resizer generalizes very well across different MaxViT model scales. The average top-1 accuracy drop was less than 0.06 when using different learned weights, indicating great transferability of the MULLER resizer. Table 13 in FIG. 12B illustrates the results of another ablation study to inspect the effects of the base resize method used inside MULLER. As demonstrated in this table, using the nearest method as the base resizer yielded similar performance as compared to the default bilinear method.

Table 14 in FIG. 13 presents the effects of anti-aliasing on the input images to MULLER resizer. The experiments reveal that while removing anti-aliasing does not affect the overall performance gain obtained by MULLER, the learned parameters may differ. The learned MULLER parameters are for different backbone models trained on ImageNet-1k. The top 3 rows show results using an anti-aliased resizer, while the bottom 3 rows depict aliased resizing. As shown in the table, the learned parameters for each backbone have a slight shift in the weights and biases. However, these place no effects on the fine-tuning performances.

Figure 14A:
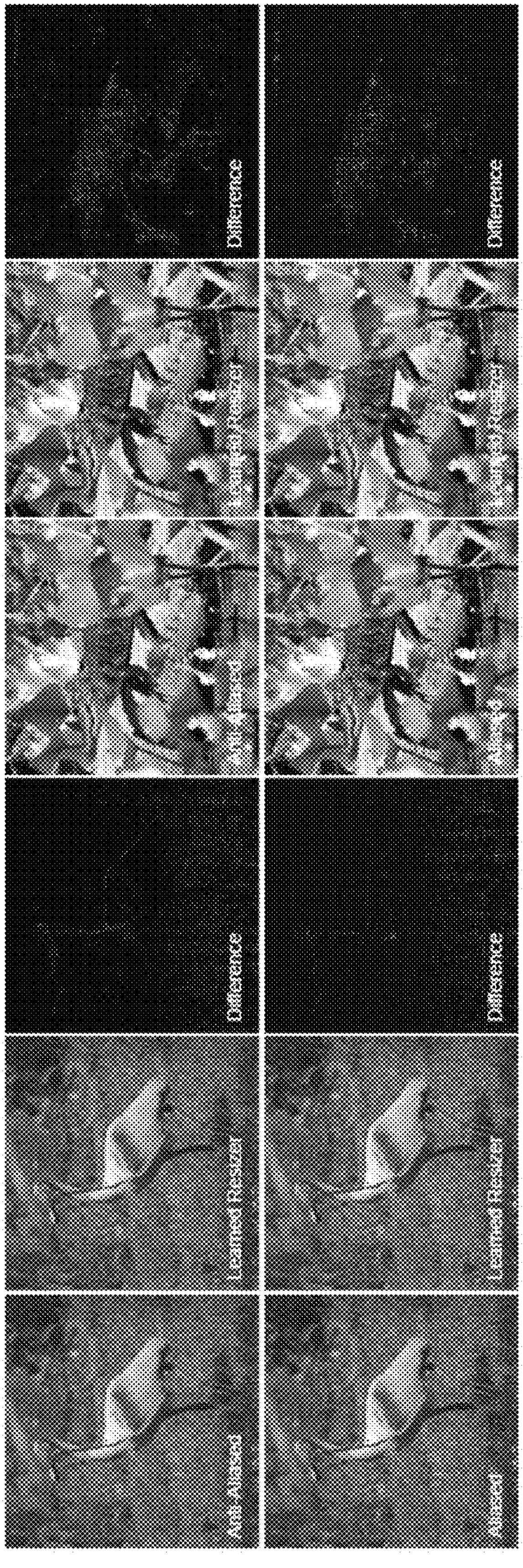
FIGS. 14A-B illustrate visualizations of anti-aliased and aliased resizing in accordance with aspects of the technology.
Figure 14B:
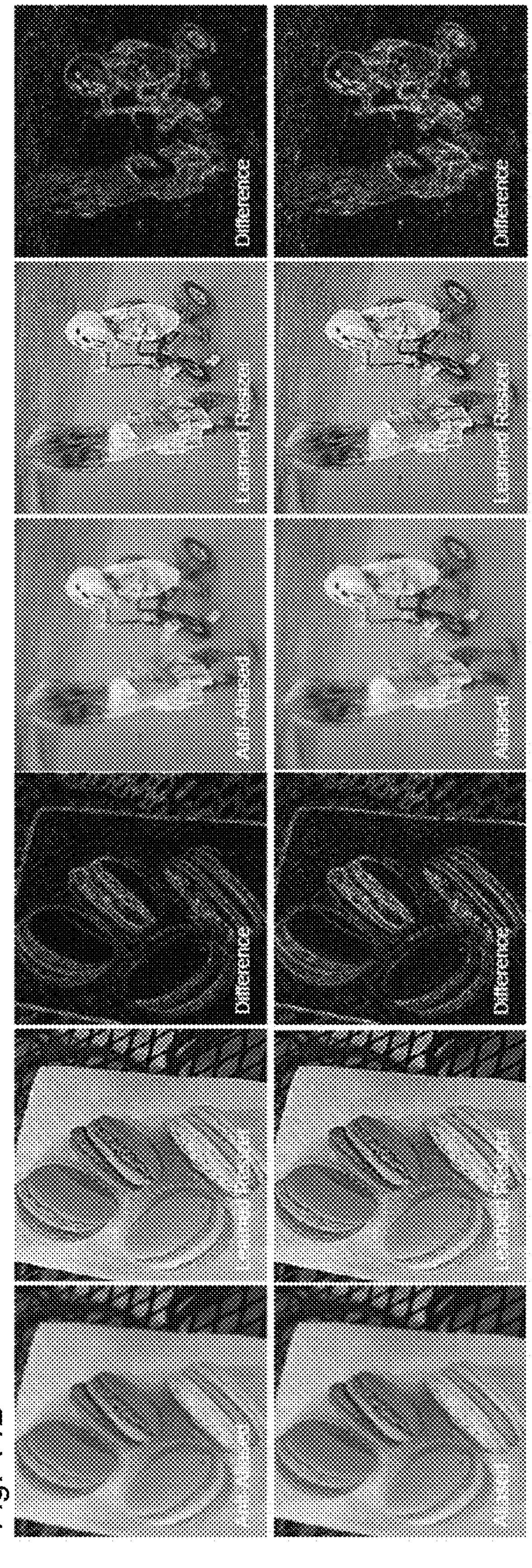
Figure 15A:
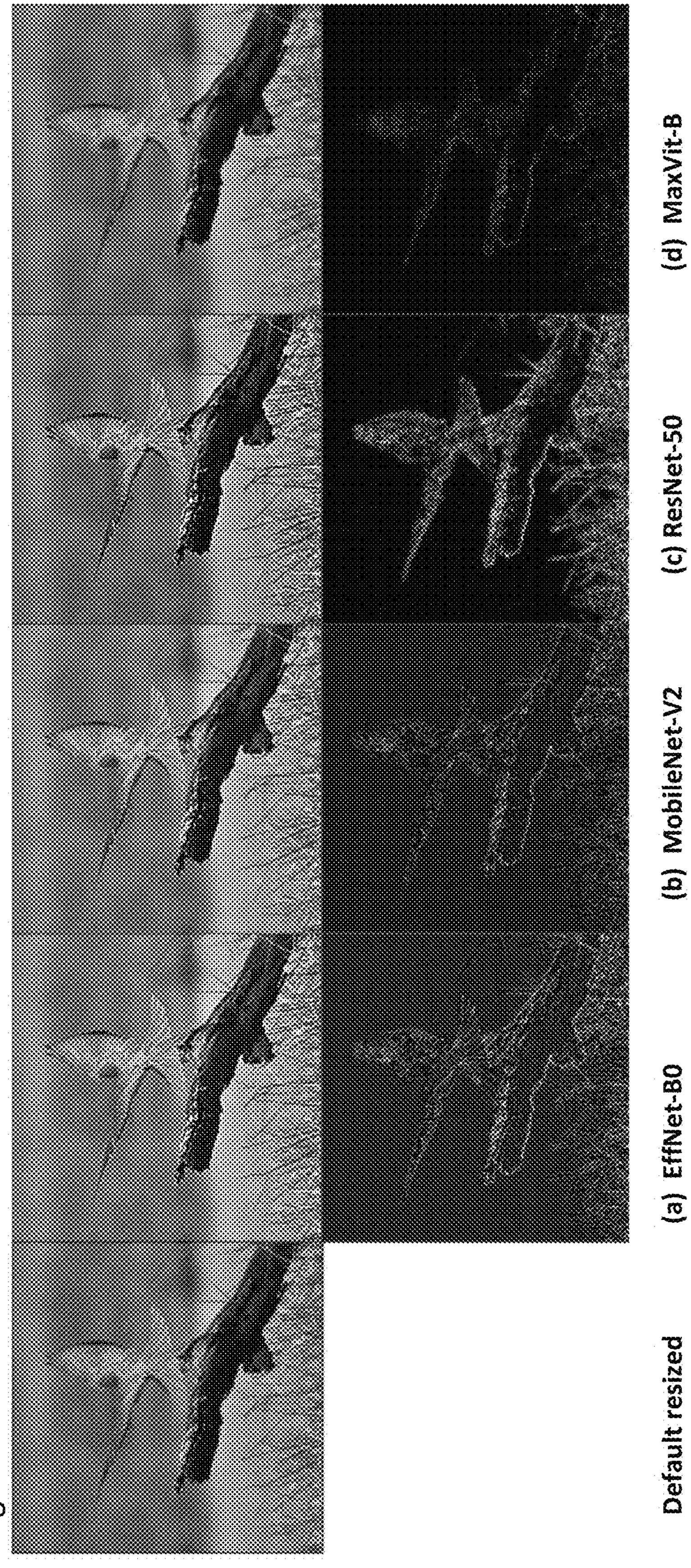
FIGS. 15A-C illustrate resizing visualizations in accordance with aspects of the technology.
Figure 15B:
Figure 15C:
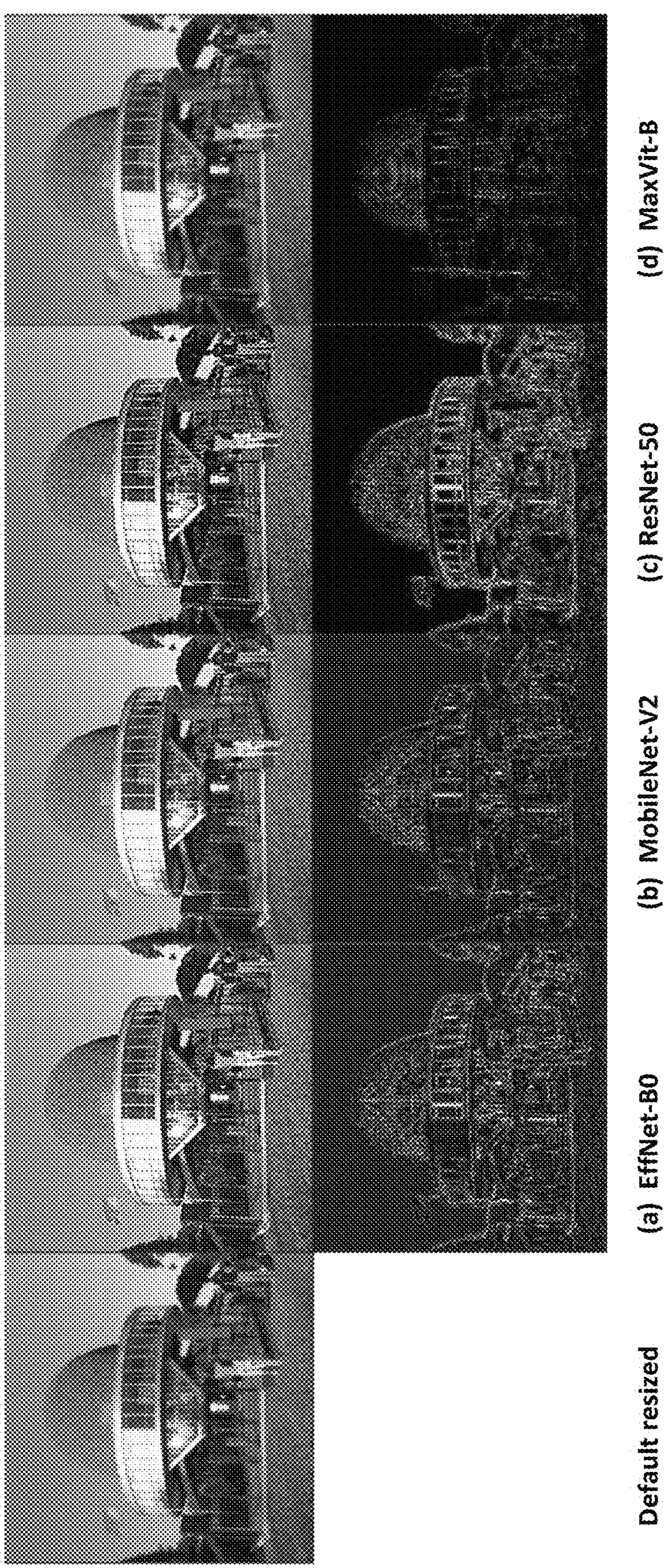
Figure 16A:
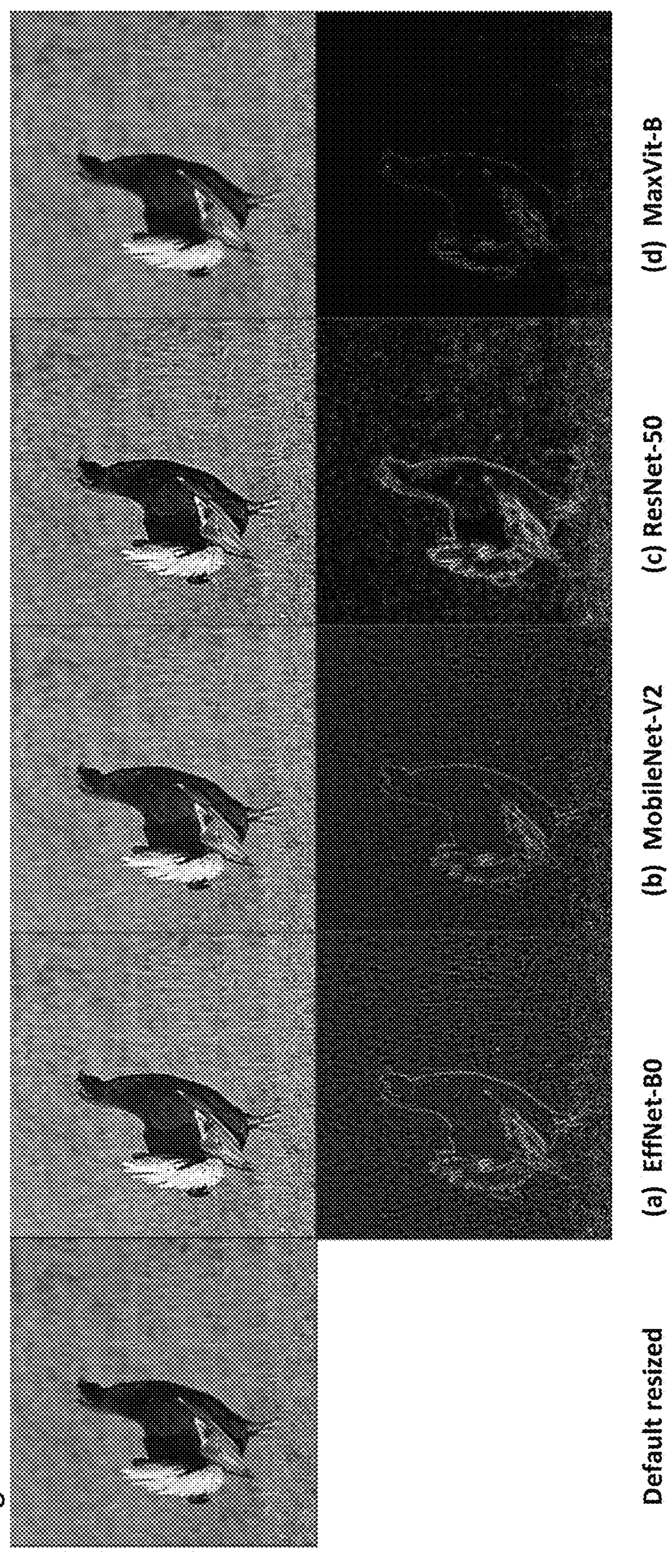
FIGS. 16A-C illustrate resizing visualizations in accordance with aspects of the technology.
Figure 16B:
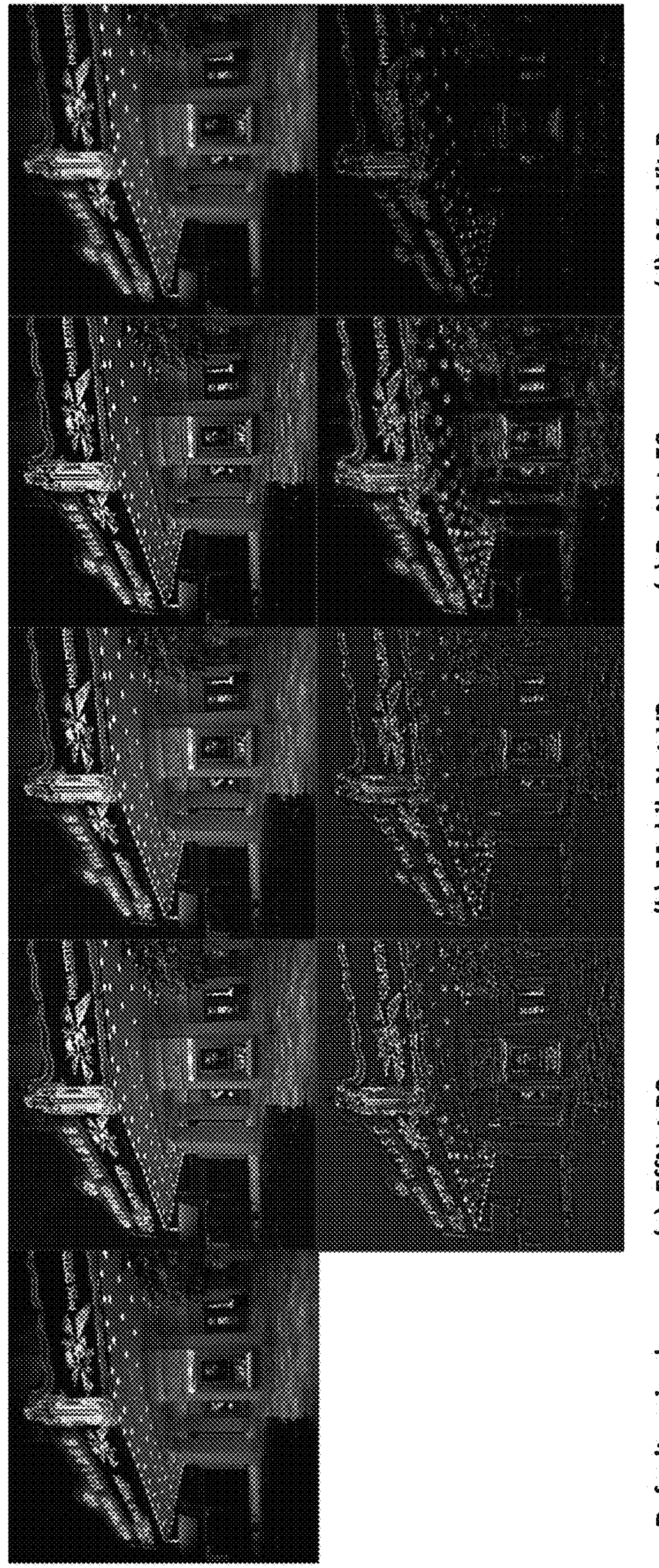
Figure 16C:
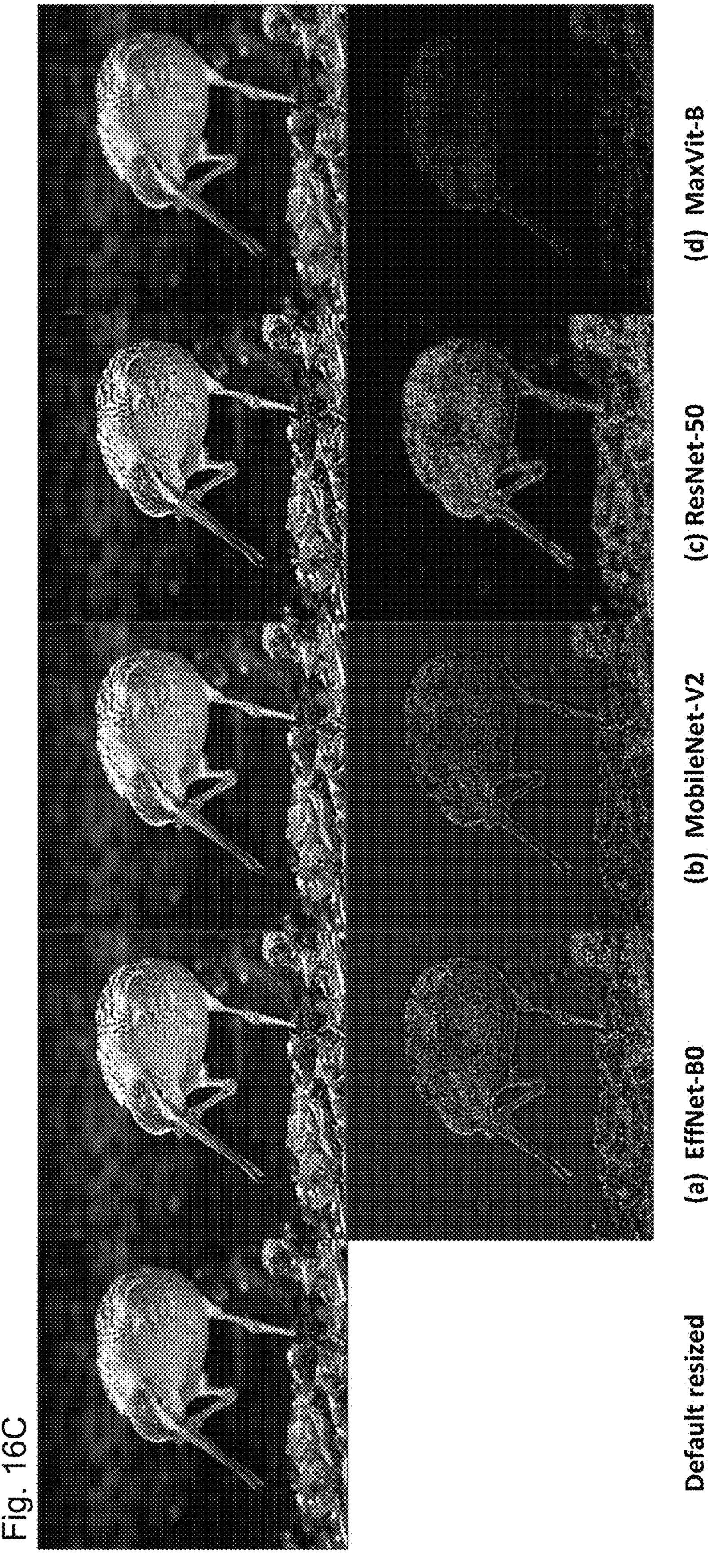

Anti-aliasing may impact the behavior of the learned resizer in terms of visualizations. For instance, as shown in FIG. 14A, when anti-aliasing is enabled for MaxViT-B, the MULLER resizer approach learns to enhance the contrast/details of the image to some extent. If the input image is aliased, nevertheless, the MULLER approach learns to reduce the 'aliased effects'. In other words, the difference image displays some patterns similar to the aliasing effects in the resized image. As for ResNet-50, from the imagery in FIG. 14B it may be seen that MULLER learns to boost details even more for aliased inputs than the anti-aliased. Both effects have not been observed to significantly impact the performances.

FIGS. 15A-C and 16A-C illustrate some additional visualization results of the learned MULLER resizer for various backbones, including (a) EffNet-B0, (b) MobileNet-V2, (c) ResNet-50, and (d) MaxViT-B, arranged in ascending order of model complexity. A few of observations can be made: First, on all the models, the MULLER resizer learns to boost the details/contrast of the image, albeit with varying degrees. Second, as is evident from the performance gain of the vision models, the embedded information in the MULLER resized images is machine-friendly, and contributes to a more effective learning of the backbone. And third, due to the highly regularized design of the resizer, the outputs of MULLER remain highly perceivable by human (in some cases even look perceptually superior), even though MULLER is purely trained for machine vision.

Figure 17A:
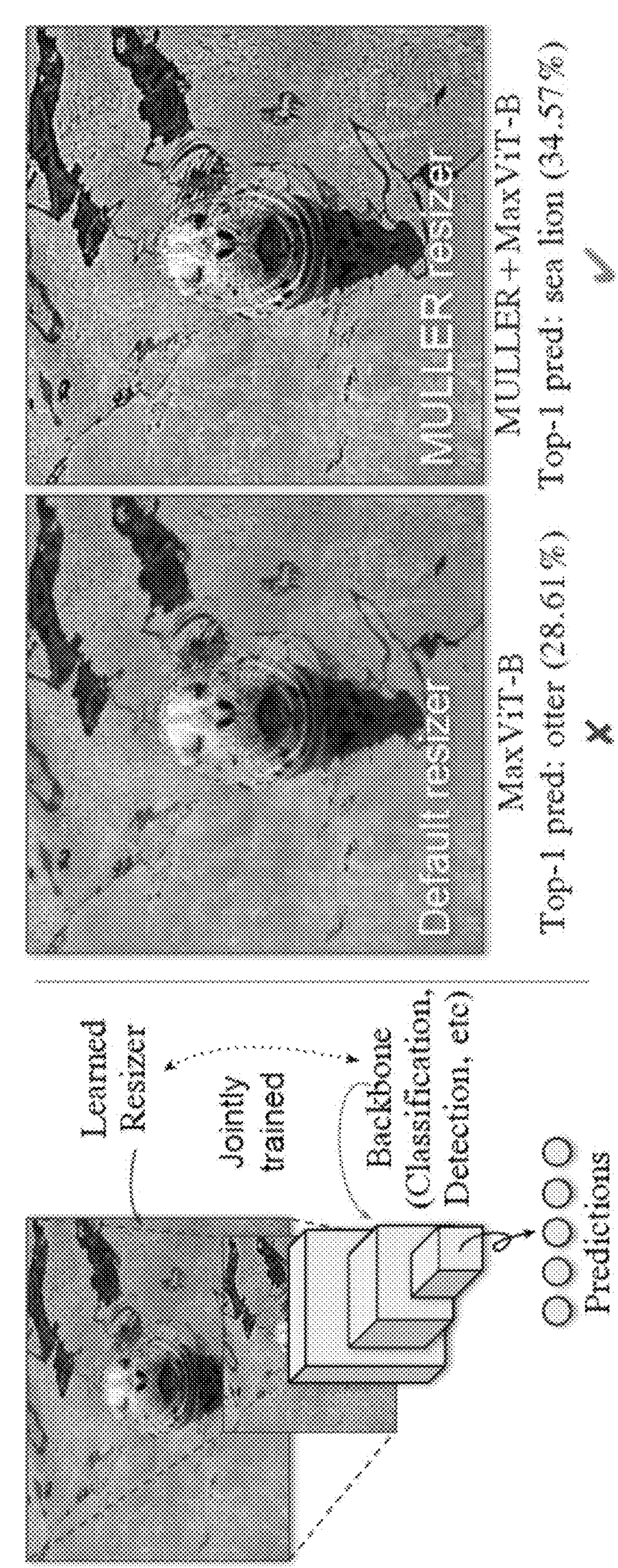
FIGS. 17A-B illustrate a resizer comparison in accordance with aspects of the technology.
Figure 17B:
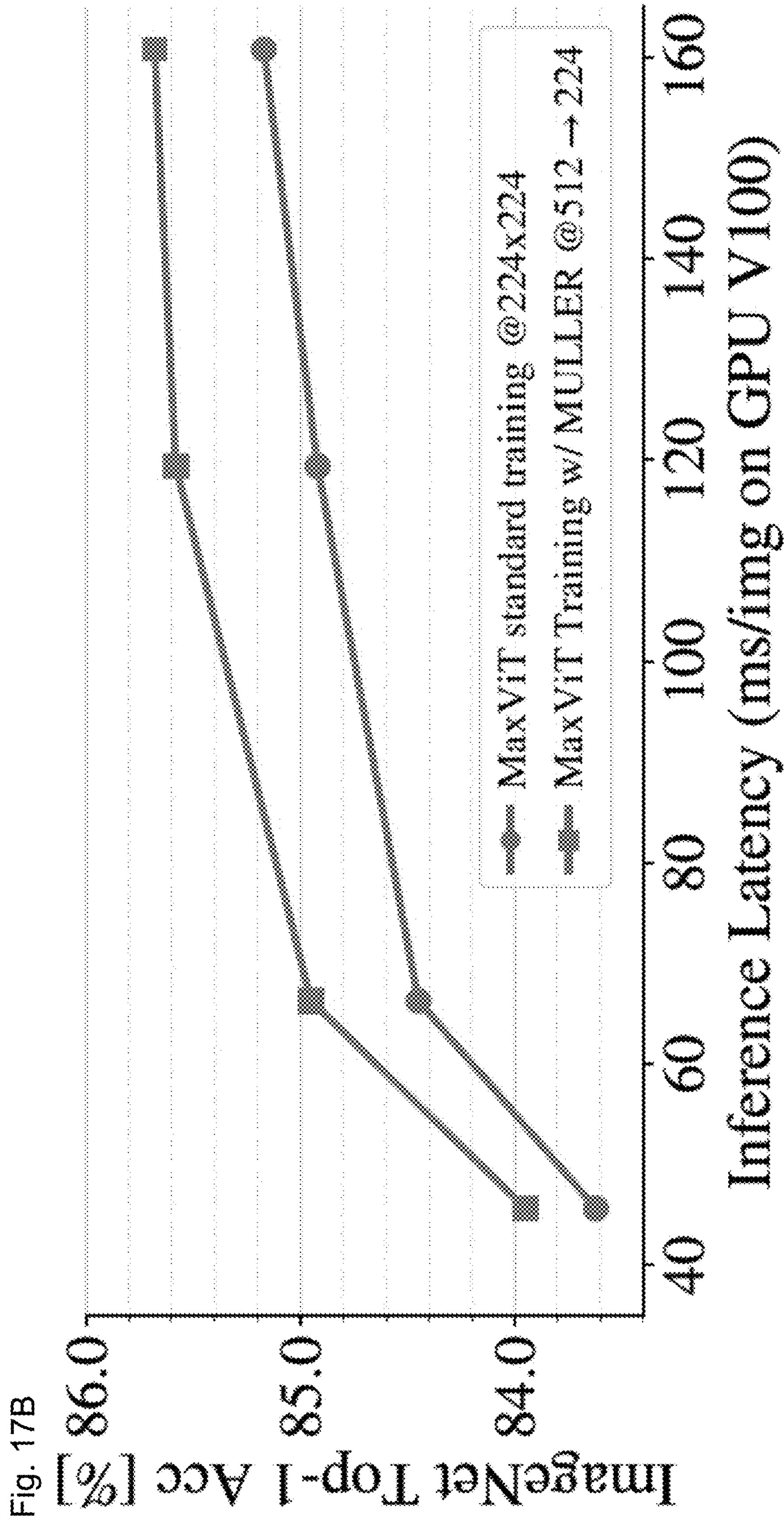

In yet another example, FIG. 17A illustrates how the learned resizer that is jointly trained with a Transformer-type model (here, a MaxViT model) can be used to perform image classification or detection and generate predictions, using an image of an otter for evaluation (from ImageNet-1K). The two images on the right compare a default resizer (left, for MaxViT-B) and the MULLER resizer (MULLER+MaxViT-B) showing detail-boosted input images from each resizer. The chart in FIG. 17B plots the inference latency for both approaches, showing that the current approach provided up to 0.6% top-1 accuracy with no extra inference cost.

Example Computing Architecture

Figure 18A:
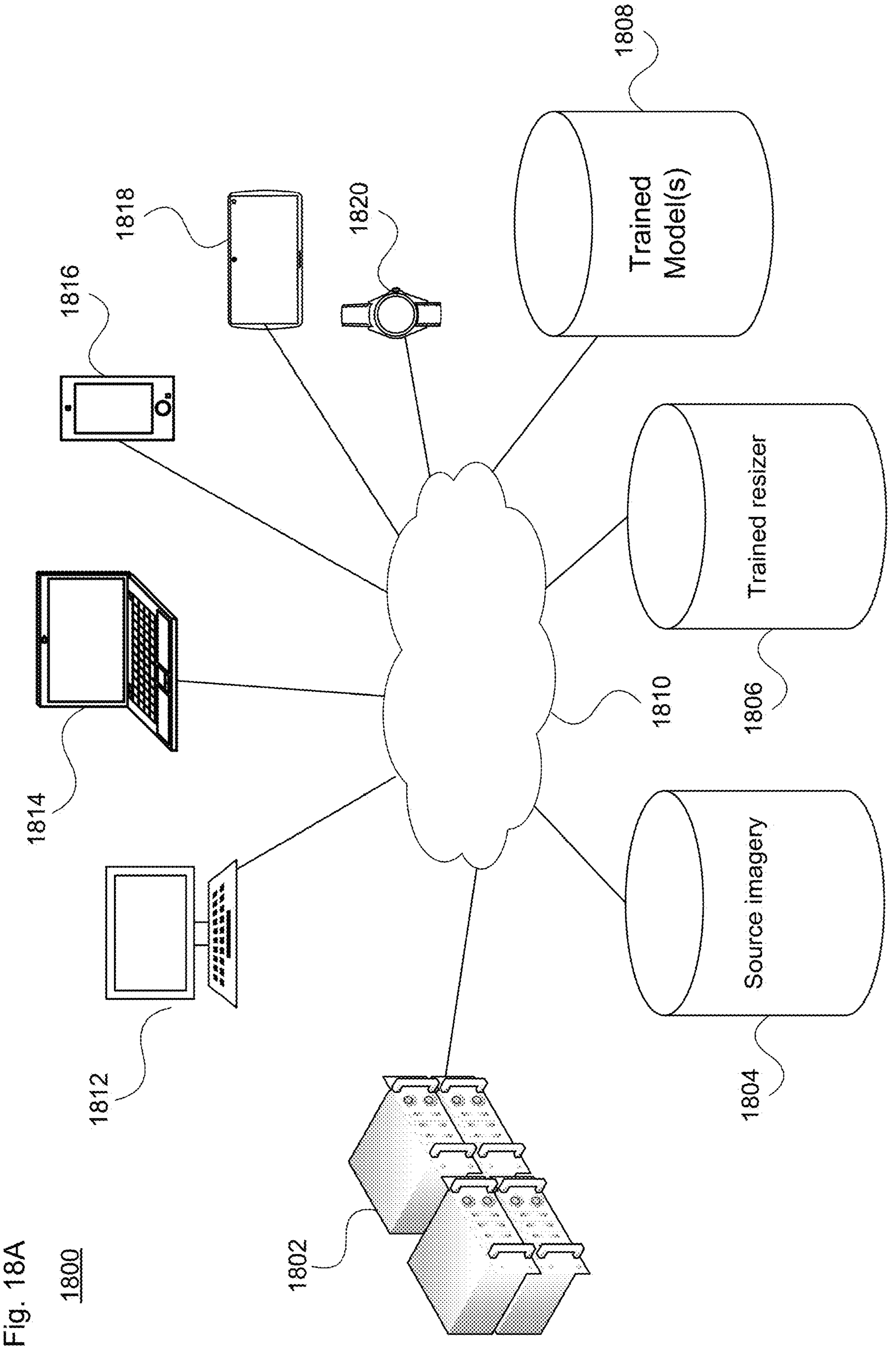
FIGS. 18A-B illustrate a system for use with aspects of the technology.
Figure 18B:
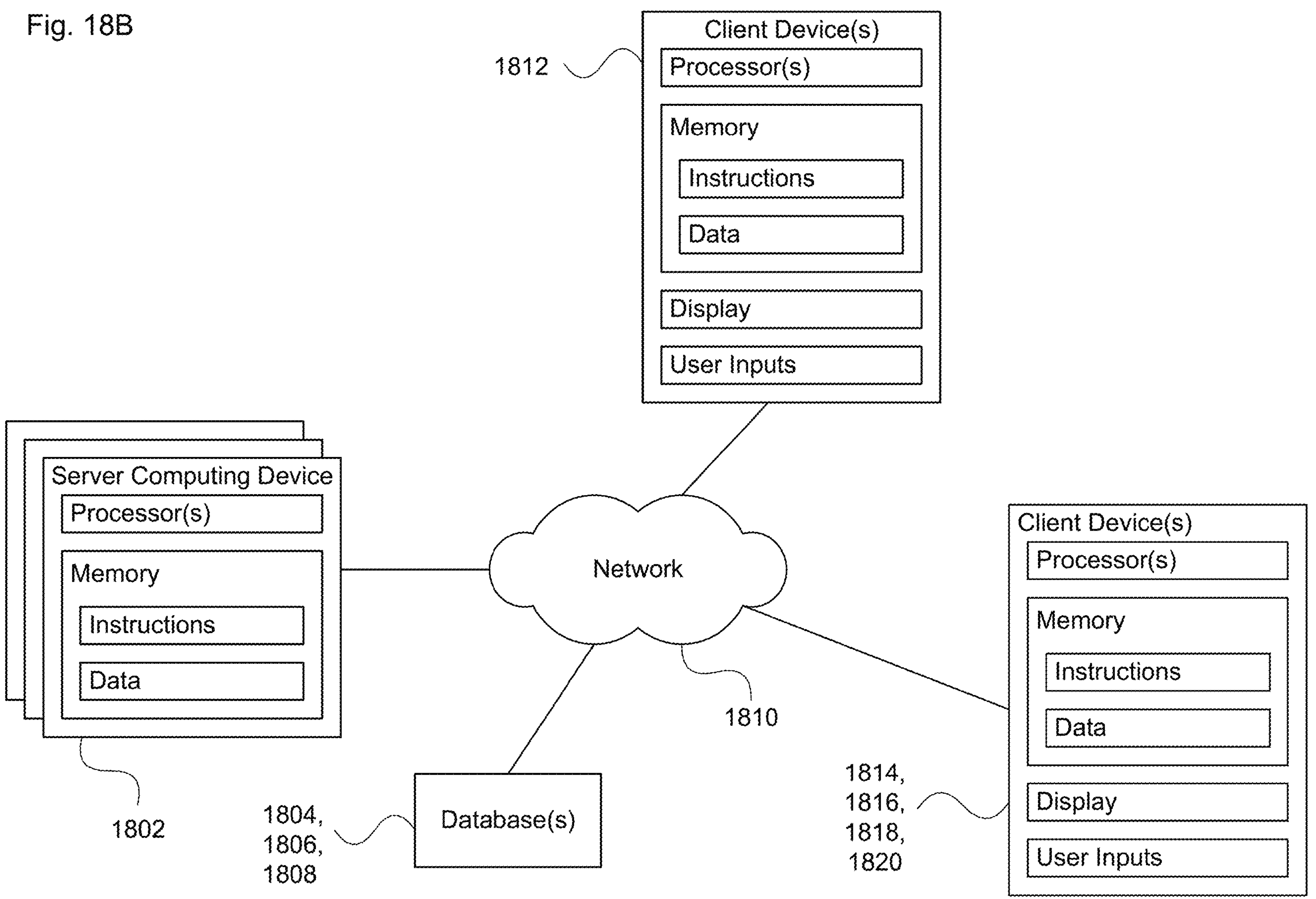

The resizer technology discussed herein may be jointly trained with an image processing model on one or more tensor processing units (TPUs), CPUs or other computing in accordance with the features disclosed herein. One example computing architecture is shown in FIGS. 18A and 18B. In particular, FIGS. 18A and 18B are pictorial and functional diagrams, respectively, of an example system 1800 that includes a plurality of computing devices and databases connected via a network. For instance, computing device(s) 1802 may be implemented as a cloud-based server system. Databases 1804, 1806 and 1808 may store, e.g., the original source imagery (e.g., still images, video segments or clips, or full videos), the resizer module and/or trained image models, respectively. The server system may access the databases via network 1810. Client devices may include one or more of a desktop computer 1812 and a laptop or tablet PC 1814, for instance to provide the original imagery or other content, and/or to view the output such as curated imagery based on image classifications, object detection or segmentation, image quality assessment, image generation (e.g., thumbnails), etc. which could be provided to the user via a web-based service, app or other program. Other client devices may include handheld devices including a personal communication device such as a mobile phone or PDA 1816 or a tablet 1818. Another example is a wearable device 1820 such as a smartwatch (or head-mounted display device).

The result output could be, for instance, semantic information about image (e.g., face detection, face recognition, etc.). Also, based on the scenarios described above, the resizer can be part of a larger image understanding system that serves multiple recognition and classification modules. For example, a photo application may run image classification on some or all of its stored photos to produce semantic tags that may be stored and later consumed by several downstream features. Moreover, there are various beneficial use cases. One includes placing the resizer on the client side (e.g., resident on a user's PC, laptop, smart phone, etc.) to resize the image/video (to generate a thumbnail) before sending it through a network to the back-end compute system. Another includes placing the resizer near the source imagery (e.g., stored on the cloud) to generate resized images (thumbnails) for sending to the back-end computing device. A third includes placing the resizer at the compute device. In the first two cases, the resizer can help to lower the cost of transferring large image/video data through the network, and also can improve the recognition performance. In the third case, only the recognition performance would be improved.

As shown in FIG. 18B, each of the computing devices 1802 and 1812-1820 may include one or more processors, memory, data and instructions. The memory stores information accessible by the one or more processors, including instructions and data (e.g., models) that may be executed or otherwise used by the processor(s). The memory may be of any type capable of storing information accessible by the processor(s), including a computing device-readable medium. The memory is a non-transitory medium such as a hard-drive, memory card, optical disk, solid-state, etc. Systems may include different combinations of the foregoing, whereby different portions of the instructions and data are stored on different types of media. The instructions may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance.

The processors may be any conventional processors, such as commercially available CPUs, TPUs, graphical processing units (GPUs), etc. Alternatively, each processor may be a dedicated device such as an ASIC or other hardware-based processor. Although FIG. 18B functionally illustrates the processors, memory, and other elements of a given computing device as being within the same block, such devices may actually include multiple processors, computing devices, or memories that may or may not be stored within the same physical housing. Similarly, the memory may be a hard drive or other storage media located in a housing different from that of the processor(s), for instance in a cloud computing system of server 1802. Accordingly, references to a processor or computing device will be understood to include references to a collection of processors or computing devices or memories that may or may not operate in parallel.

The computing devices may include all of the components normally used in connection with a computing device such as the processor and memory described above as well as a user interface subsystem for receiving input from a user and presenting information to the user (e.g., text, imagery, videos and/or other graphical elements). The user interface subsystem may include one or more user inputs (e.g., at least one front (user) facing camera, a mouse, keyboard, touch screen and/or microphone) and one or more display devices (e.g., a monitor having a screen or any other electrical device that is operable to display information (e.g., text, imagery and/or other graphical elements). Other output devices, such as speaker(s) may also provide information to users.

The user-related computing devices (e.g., 1812-1820) may communicate with a back-end computing system (e.g., server 1802) via one or more networks, such as network 1810. The network 2010, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 1802 may include one or more server computing devices having a plurality of computing devices, e.g., a load balanced server farm or cloud computing system, that exchange information with different nodes of a network for the purpose of receiving, processing and transmitting the data to and from other computing devices. For instance, computing device 1802 may include one or more server computing devices that are capable of communicating with any of the computing devices 1812-1820 via the network 1810. The computing device 1802 may implement a back-end inference server (e.g., a cloud-based inference server), which receives thumbnail imagery from a thumbnail generator implemented by desktop computer 1812, laptop/tablet PC 1814, mobile phone or PDA 1816, tablet 1818 or wearable device 1820.

Module and model information or other data derived from the approaches discussed herein may be shared by the server with one or more of the client computing devices. Alternatively or additionally, the client device(s) may maintain their own databases, models, etc.

FIG. 19 illustrates an example flow diagram 1900 in accordance with aspects of the technology. The flow diagram illustrates computer-implemented image resizing method comprising, at block 1902, obtaining an input image having a first resolution. At block 1904, the method includes applying the input image to a baseline resizer to obtain a default resized image, and at block 1906, applying the input image to a plurality of filters. Each respective filter in the plurality is configured to, at block 1908, perform sub-band filtering on the input image to obtain a sub-band filtered result; at block 1910, apply the sub-band filtered result to the baseline resizer to obtain a respective resized result, and at block 1912 apply, to the respective resized result, a scaling parameter, a bias parameter, and a nonlinear function to obtain a respective filtered image. Then at block 1914 the method includes combining the default resized image and the respective filtered images to generate a combined resized image.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A computer-implemented image resizing method comprising:

obtaining, by one or more processors of a computing system, an input image having a first resolution;

applying, by the one or more processors, the input image to a baseline resizer to obtain a default resized image;

applying, by the one or more processors, the input image to a plurality of filters, for each respective filter in the plurality:

performing sub-band filtering on the input image to obtain a sub-band filtered result;

applying the sub-band filtered result to the baseline resizer to obtain a respective resized result; and applying, to the respective resized result, a scaling parameter, a bias parameter, and a nonlinear function to obtain a respective filtered image; and combining, by the one or more processors, the default resized image and the respective filtered images to generate a combined resized image.

2. The method of claim 1, wherein the respective filtered images from the plurality of filters are Laplacian residual images.

3. The method of claim 1, further comprising processing the combined resized image with a trained image processing model to generate a set of output predictions for an image processing task.

4. The method of claim 1, wherein the scaling parameter is trained concurrently with an image processing model.

5. The method of claim 1, wherein the bias parameter is trained concurrently with an image processing model.

6. The method of claim 5, wherein the scaling parameter is trained concurrently with the image processing model.

7. The method of claim 1, wherein the method is implemented by training an image resizer module concurrently with an image processing model.

8. The method of claim 1, wherein performing the sub-band filtering includes using a difference of filters to decompose the input image into a set of different detail layers.

9. The method of claim 1, wherein the sub-band filtering is performed using a Gaussian kernel as a base filter.

10. The method of claim 9, wherein the base filter has a standard deviation of 1.

11. The method of claim 1, wherein the nonlinear function is applied after application of the scaling parameter and the bias parameter.

12. The method of claim 1, wherein the combined resized image is a thumbnail image of the input image.

13. The method of claim 12, further comprising transmitting the thumbnail image to a remote processing device to perform one or more vision tasks on the thumbnail image.

14. The method of claim 13, wherein the one or more vision tasks include at least one of image classification, object detection, object segmentation, or image quality assessment.

15. A processing system comprising:

memory configured to store imagery; and one or more processors operatively coupled to the memory, the one or more processing being configured to:

obtain an input image from the memory, the input image having a first resolution;

apply the input image to a baseline resizer to obtain a default resized image;

apply the input image to a plurality of filters, for each respective filter in the plurality configured to:

perform sub-band filtering on the input image to obtain a sub-band filtered result;

apply the sub-band filtered result to the baseline resizer to obtain a respective resized result; and apply, to the respective resized result, a scaling parameter, a bias parameter, and a nonlinear function to obtain a respective filtered image; and combine the default resized image and the respective filtered images to generate a combined resized image.

16. The processing system of claim 15, wherein the one or more processors are further configured to either store the combined resized image in the memory or to transmit the combined resized image to a remote processing device to perform one or more vision tasks on thereon.

17. The processing system of claim 15, wherein the one or more processors are further configured to process the combined resized image with a trained image processing model to generate a set of output predictions for an image processing task.

18. The processing system of claim 15, wherein at least one of the scaling parameter or the bias parameter is trained concurrently with an image processing model.

19. The processing system of claim 15, wherein performance of the sub-band filtering includes use of a difference of filters to decompose the input image into a set of different detail layers.

20. The processing system of claim 15, wherein:

the combined resized image is a thumbnail image of the input image;

the processing system is implemented in a client device; and the processing system is configured to transmit the thumbnail image to a remote server to derive semantic information about the thumbnail image.

21. The processing system of claim 15, wherein:

the combined resized image is a thumbnail image of the input image;

the processing system is implemented in a server device;

the one or more processers are configured to derive semantic information about the thumbnail image; and the one or more processors are further configured to perform a vision task based on the semantic information.

* * * * *